(12) United States Patent
Kumar et al.

(10) Patent No.: US 10,991,349 B2
(45) Date of Patent: Apr. 27, 2021

(54) METHOD AND SYSTEM FOR MUSICAL SYNTHESIS USING HAND-DRAWN PATTERNS/TEXT ON DIGITAL AND NON-DIGITAL SURFACES

(71) Applicant: Samsung Electronics Co., Ltd., Suwon-si (KR)

(72) Inventors: Arun Kumar, Noida (IN); Rohit Thapliyal, Noida (IN); Ankush Tarika, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/410,341

(22) Filed: May 13, 2019

(65) Prior Publication Data
US 2020/0020310 A1    Jan. 16, 2020

(30) Foreign Application Priority Data
Jul. 16, 2018 (IN) .............................. 201811026457

(51) Int. Cl.
| | | |
|---|---|---|
| *G10H 1/00* | (2006.01) | |
| *G06F 3/16* | (2006.01) | |
| *G06F 3/0484* | (2013.01) | |
| *G06F 3/01* | (2006.01) | |

(52) U.S. Cl.
CPC ........... *G10H 1/0008* (2013.01); *G06F 3/167* (2013.01); *G06F 3/012* (2013.01); *G06F 3/04845* (2013.01); *G10H 2220/096* (2013.01)

(58) Field of Classification Search
CPC ...................... G10H 1/0008; G10H 2220/096; G06F 3/167; G06F 3/012; G06F 3/04845
See application file for complete search history.

(56) References Cited

U.S. PATENT DOCUMENTS

| | | | |
|---|---|---|---|
| 6,005,181 A | * | 12/1999 | Adams ................. G10H 1/0558 84/734 |
| 6,388,183 B1 | | 5/2002 | Leh |
| 7,474,197 B2 | | 1/2009 | Choi et al. |
| 8,222,507 B1 | | 7/2012 | Salazar et al. |
| 8,525,014 B1 | | 9/2013 | Scharfeld |
| 8,593,421 B2 | | 11/2013 | Krishnaswamy et al. |

(Continued)

FOREIGN PATENT DOCUMENTS

| | | |
|---|---|---|
| JP | 2017-073590 A | 4/2017 |
| KR | 10-2006-0065255 A | 6/2006 |
| WO | 2017/031421 A1 | 2/2017 |

OTHER PUBLICATIONS

International Search Report dated Oct. 17, 2019, issued in International Patent Application No. PCT/KR2019/008229.
(Continued)

*Primary Examiner* — Jeffrey Donels
(74) *Attorney, Agent, or Firm* — Jefferson IP Law, LLP

(57) ABSTRACT

The disclosure relates to a method and apparatus for creating and synthesizing music. The disclosed method comprises obtaining at least one image including at least one object related to at least one first musical instrument, identifying a user input associated with the at least one object, mapping the at least one object to at least one second musical instrument, and generating sound based on the user input and sound data of the at least one second musical instrument.

16 Claims, 18 Drawing Sheets

(56) References Cited

U.S. PATENT DOCUMENTS

| | | |
|---|---|---|
| 8,618,405 B2 | 12/2013 | Tansley |
| 8,664,508 B2 | 3/2014 | Tabata |
| 9,104,271 B1 | 8/2015 | Adams et al. |
| 9,542,919 B1 | 1/2017 | Bencar et al. |
| 9,633,638 B2 * | 4/2017 | Lim ..................... G10H 1/0058 |
| 9,679,547 B1 | 6/2017 | Zünd et al. |
| 2010/0178028 A1 | 7/2010 | Wahrhaftig et al. |
| 2010/0183183 A1 | 7/2010 | Bae et al. |
| 2010/0288108 A1 | 11/2010 | Jung et al. |
| 2012/0007884 A1* | 1/2012 | Kim ........................ G10H 1/24 |
| | | 345/633 |
| 2012/0062718 A1 | 3/2012 | David |
| 2012/0144979 A1 | 6/2012 | Tansley |
| 2012/0242581 A1 | 9/2012 | Laubach |
| 2015/0143976 A1 | 5/2015 | Katto et al. |
| 2016/0042727 A1 | 2/2016 | Lim et al. |
| 2016/0099009 A1 | 4/2016 | Kim |
| 2017/0011724 A1 | 1/2017 | Cook et al. |

OTHER PUBLICATIONS

European Search Report dated Mar. 2, 2021; European Appln. No. 19838591.6-1203/3759707 PCT/KR2019008229.

* cited by examiner

METHOD AND SYSTEM FOR MUSICAL SYNTHESIS USING HAND-DRAWN PATTERNS/TEXT ON DIGITAL AND NON-DIGITAL SURFACES

CROSS REFERENCE TO RELATED APPLICATION(S)

This application is based on and claims priority under 35 U.S.C. § 119(a) of a Indian patent application number 201811026457, filed on Jul. 16, 2018, in the Indian Patent Office, the disclosure of which is incorporated by reference herein in its entirety.

BACKGROUND

1. Field

The disclosure relates to a method to create and synthesize music, and a system.

2. Description of Related Art

In the current era of technology we are interacting with lot of music devices in real life or using virtual/augmented reality along with many helping devices or sensors based on different forms of interaction such as gesture based interaction, voice based interaction, touch based interaction, click based interaction, retina based interaction, and the like. The digitization of music has fundamentally shifted every aspect of the industry, from the way music is recorded to the manner in which albums are distributed and marketed.

The electronic devices including mobile devices, smartphones, tablets, computers, personal computers, laptops, and the like used presently are capable of performing various functions using various applications. Some useful applications of these devices include entertainment, recreation and learning. Different styles or types of music may emphasize, de-emphasize or omit some of these elements. Music is played with a vast range of instruments and vocal techniques ranging from singing to rapping also, there are solely instrumental pieces, solely vocal pieces (such as songs without instrumental accompaniment) and pieces that combine singing and instruments.

The definition of "sound synthesis" includes combining elements of sound to make a desired sound. Sound synthesis can use existing sounds as elements or create new sounds, either electronically or mechanically. The world of synthesis is a complicated one, and it has expanded exponentially, in scope and method, of the Theremin, one of the first electronic instruments, to synthesizers, and samplers. A major boost for audio synthesis was the application of digital technology in sound. As a result, the scope of synthesis has multiplied many folds in a short period of time. Digital technology applied to synthesis has led to the formation of entirely new disciplines such as a visual programming languages for multimedia (e.g., maximum signal processing (MAX/MSP), pure data, jitter, etc.), that rely on computer codes to produce sound. Digital technology has made it possible to condense what would have been tones of electronic equipment, and thousands of hours of work, into a portable personal computer that can do the same work in the matter of seconds.

Instruments can be categorized according to common use, such as signal instruments, 10 a category that may include instruments in different Hornbostel-Sachs categories such as trumpets, drums, and gongs. Throughout history, various methods of musical instrument classification have been used like the European culture classifies instruments according to orchestral instrument families. The most commonly used system divides instruments into keyboard instruments, string instruments, woodwind instruments, brass instruments and percussion instruments, however, other schemes have been devised.

As such, there are many input devices which allow users to create, compose and control the music. Such state of arts are function with the combination of gestures, sensors, applications and touch screen enabled input device or click based input device etc. The existing state of art allows users to create and control the music with gestures using some sensors enabled gloves. A user can use the sensor enabled gloves by spreading across the fingertips and palm on any firm surface (say glass, wood, any board, wall etc.) into an instrument. The existing state of art allows user to create the music with touch screen events using some music based application on different platforms. The user can use the sensor enabled gloves by spreading across the fingertips or finger touch on the touch enabled input devices.

Presently, it is not possible for a user to have multiple on-demand music instruments. The user is not enabled with features that allow drawing and playing on digital as well as non-digital platform making it more interactive and immersive. Further, the user cannot customize the music instrument e.g. draw a complete/partial part of music instrument, draw musical notes in text/symbol form to generate synthesized sound effects according to the user's position, parameter and orientation. Also, run-time modification or any user demanded customization in music instrument is not available. It is not even possible for a user to add background sound objects to the synthesized music. Therefore, there is a need to create a system and method to overcome the abovementioned drawbacks.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method to identify patterns and map them to music instruments.

Another aspect of the disclosure is to provide a system and a method to create and synthesize music.

Another aspect of the disclosure is to provide a system and a method to unlock octaves of music instruments in real-time.

Another aspect of the disclosure is to provide a system and a method to map music parameters with music instruments.

Another aspect of the disclosure is to provide a system and a method to generate perspective sound and additional background music using the musical instrument.

Another aspect of the disclosure is to provide a system and a method to multiplex musical instruments.

Another aspect of the disclosure is to provide a system and a method to interact with texts and symbols.

Additional aspects will be set forth in part in the description which follows and, in part, will be apparent from the description, or may be learned by practice of the presented embodiments.

In accordance with an aspect of the disclosure, a method to create and synthesize music is provided. The method comprises acquiring at least one image from at least one of an existing database, a surface, a camera, detecting at least one of a music instrument, a part of the music instrument, user defined interaction boundaries and/or background information from said acquired image, identifying at least one of a music parameter or a background sound parameter based on said detection, mapping said music parameters to at least one of the detected music instrument, the part of the music instrument, the user defined interaction boundaries, and/or the background information from said acquired image, unlocking octaves of at least one of the detected musical instrument in real-time, receiving position, orientation, relative position, depth and/or size of the at least one musical instrument, receiving at least one interaction input on the basis of said acquired image, and generating perspective sound based on at least one of said received interaction input, relative position, orientation or size of said at least one musical instrument.

In accordance with an aspect of the disclosure, music is synthesized based on at least one of the interaction input or the background sound parameters.

In accordance with another aspect of the disclosure, a plurality of music instruments are detected and further coupled to say at least one detected music instrument.

In accordance to another aspect of the disclosure, sound of at least one music instrument is generated from another music instrument.

In accordance with another aspect of the disclosure, perspective sound is generated on the basis of at least one of relative position of user and/or relative position of identified objects with said musical instrument.

In accordance with another aspect of the disclosure, a virtual reality (VR) device is capable of detecting relative position of the user with the musical instrument.

In accordance with another aspect of the disclosure, the acquired image include at least one of a hand drawn image, printed image, image template or text.

In accordance with another aspect of the disclosure, plurality of users are identified and mapped on the basis of plurality of surfaces to said music instruments.

In accordance with another aspect of the disclosure, music is generated and synthesized by plurality of users based on at least one of said received interaction input, relative position, orientation or size of said musical instruments.

In accordance with another aspect of the disclosure, the acquired image is captured by at least one sensor on an electronic device.

In accordance with another aspect of the disclosure, the sensor is at least one of optical sensor, image sensor, infrared sensor and/or electronic input sensor.

In accordance with another aspect of the disclosure, the surface is at least one of electronic surface or non-electronic surface.

In accordance with another aspect of the disclosure, the electronic surface generates image files in electronic format and non-electronic surface generates image files in non-electronic format.

In accordance with another aspect of the disclosure, detection and identification is done on at least one of the cloud server, local server or user electronic device.

In accordance with another aspect of the disclosure, music parameters include at least one of octaves, notes, notes composition and scale.

In accordance with another aspect of the disclosure, said music parameters are configured to generate sound based on said user interaction input.

In accordance with another aspect of the disclosure, said user interaction input includes at least one of written notes or text of said at least one musical instrument.

In accordance with another aspect of the disclosure, interaction input is generated by at least one of gesture, touch, voice or stylus.

In accordance with another aspect of the disclosure, synthesizing comprises at least one of generating a musical note based on interaction input on the hand drawn image and mapping information; merging at a set of musical notes generated by a set of interaction inputs on a set of hand drawn images, merging at least one musical note generated by at least one interaction input on at least one hand drawn image and the background sound parameters.

In accordance with another aspect of the p disclosure, method further comprises receiving at least one further interaction input on the hand drawn image, and synthesizing music based on the further interaction input, the background sound parameters.

In accordance with another aspect of the disclosure, method further comprises updating at least one of hand drawn image or image template, synthesizing music based on at least one of updated hand drawn image or image template.

In accordance with another aspect of the disclosure, method further comprises composing a music file based on the music synthesis.

In accordance with an embodiment of the disclosure, a system comprises a user device to acquire at least one image from at least one of an existing database, a surface, a camera, a server to detect at least one of music instrument, a part of music instrument, user defined interaction boundaries and/or background information from the acquired image, an object mapping module to map at least one music parameter to at least one of detected music instrument, the part of music instrument, the user defined interaction boundaries and/or the background information from the hand drawn image, an octave unlocking module to unlock octaves of at least one detected musical instrument in real-time, a sensor module to receive position, orientation, relative position, depth and/or size of at least one musical instrument using sensor units, an audio module to receive at least one interaction input on the basis of said acquired image, a generation module to generate perspective sound based on at least one of said received interaction input, relative position, orientation, or size of said at least one musical instrument, and a motion detection module to detect at least one interaction input from the hand drawn image.

In accordance with an embodiment of the disclosure, system further comprises a processing module to synthesize music based on the interaction input.

In accordance with another embodiment of the disclosure, system further comprises detecting a plurality of music instruments and coupling said at least one detected music instrument to plurality of music instruments.

In accordance to another embodiment of the disclosure, sound of at least one music instrument is generated from another music instrument.

In accordance to another embodiment of the disclosure, wherein perspective sound is generated on the basis of at least one of relative position of the user and/or relative position of identified objects with the musical instrument.

In accordance to another embodiment of the disclosure, a virtual reality (VR) device is capable of detecting relative position of the user with the musical instrument.

In accordance to another embodiment of the disclosure, the acquired image includes at least one of a hand drawn image, printed image, template image, digital surface pattern, digital format images or text.

In accordance to another embodiment of the disclosure, plurality of users are identified and mapped on the basis of plurality of surfaces to said music instruments.

In accordance to another embodiment of the disclosure, music is generated and synthesized by plurality of users based on at least one of said received interaction input, relative position, orientation or size of said musical instruments.

In accordance to another embodiment of the disclosure, the hand drawn image is captured by at least one sensor on an electronic device.

In accordance to another embodiment of the disclosure, the sensor is at least one of optical sensor, image sensor, infrared sensor and/or electronic input sensor.

In accordance to another embodiment of the disclosure, the surface is at least one of electronic surface or non-electronic surface.

In accordance to another embodiment of the disclosure, the electronic surface generates image files in electronic format and non-electronic surface generates image files in non-electronic format.

In accordance to another embodiment of the disclosure, detection and identification is done on at least one of the cloud server, local server and/or user electronic device.

In accordance to another embodiment of the disclosure, the music parameters include at least one of octaves, notes, notes composition and scale.

In accordance to another embodiment of the disclosure, said music parameters are configured to generate sound based on said user interaction input.

In accordance to another embodiment of the disclosure, said user interaction input includes at least one of written notes or text of said at least one musical instrument.

In accordance to another embodiment of the disclosure, the interaction input is generated by at least one of gesture, touch, voice and/or stylus.

In accordance to another embodiment of the disclosure, the processing module includes at least one of a generating means to generate at least one musical note based on said interaction input of hand-drawn image and said mapping, a merging means to merge at least a set of musical notes generated by the set of interaction inputs of set of hand drawn images, and the merging means to further merge at least one musical note generated by at least one interaction input of at least one hand drawn image and the background sound parameters.

In accordance to another embodiment of the disclosure, system further comprises a receiving means to receive at least one further interaction input of hand drawn image, and the processing module to synthesize music based on at least one of further interaction input and/or background sound parameters.

In accordance to another embodiment of the disclosure, system further comprises an updating means to update at least one of hand drawn image or image template, and the processing module to synthesize music based on at least one of updated hand drawn image or image template.

In accordance to another embodiment of the, system further comprises a compiling means to compose a music file based on music synthesis.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
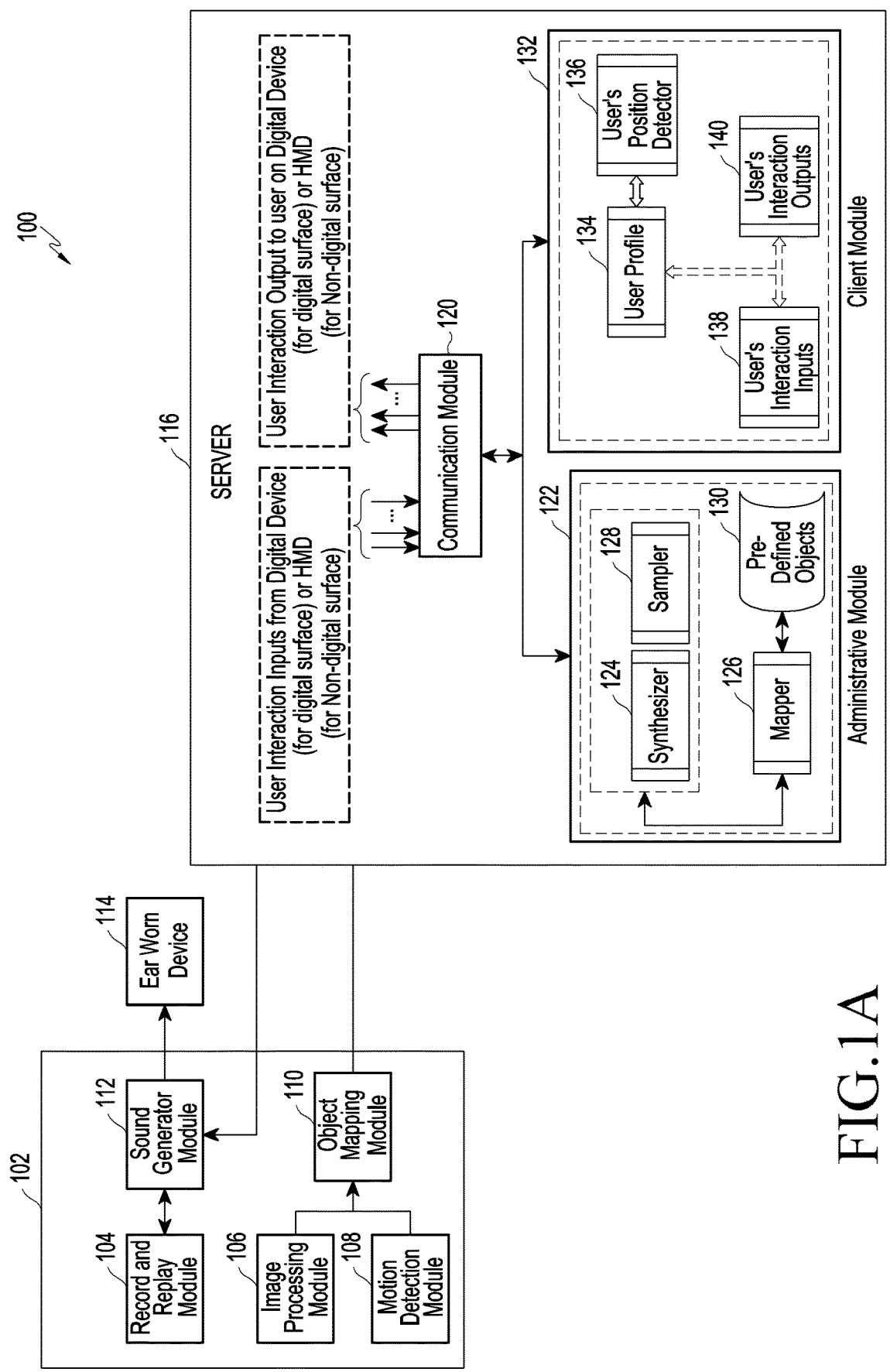
FIG. 1A illustrates a system overview according to an embodiment of the disclosure.

FIG. 1A illustrates a system overview according to an embodiment of the disclosure.

Referring to FIG. 1, a system 100 includes various modules dealing with operations such as motion detection and gesture recognition, drawn image identification, identified image mapping onto a real instrument, finger/hand motion detection and corresponding mapped sound instruments notes generation and communication of various components. The system is enabled to scan the images taken from camera module or drawn on a digital surface of a user device 102. The user device 102 preprocesses the image to isolate the noise levels and extracts the objects from the image. The errors are mitigated and the precision of the image is enhanced to correctly map the instrument or physical objects. The image is further sent to an object detection module to be further shared with the server 116 for object identification and mapping. The identified objects could be one of the predefined objects such as piano keys, guitar strings, percussion instruments, scenery, real objects such as river, winds, chirping birds, and the like.

The motion detection module 108 detects a hand or arm motion to detect the kind of pattern being currently drawn by a user. It detects the continuous motion of arm, hand and fingers when a user draws or plays the drawn musical instrument. A passive infrared (PIR) motion detector detects the infrared energy emitted by human body parts and identifies the change in energy levels which eventually transforms to motion detection and pattern identification. The PIR motion detector sends a pre-processed image of an object drawn by the user to the server 116. The object mapping module 110, on successful match with an object, receives the object information and corresponding music file which could belong to a specific octave or the whole instrument notes. If the user device 102 does not locally store the mapped musical instruments and objects, the object mapping module 110 may further request the server 116 to send the corresponding sound data based on a trigger the motion detection module 108 or image processing module 106. That is, the object mapping module 110 communicates with the sound generating module for producing the real time sound of the drawn pattern.

The server 116 is directly linked to the communication module 120, which handles single/multiple client request simultaneously. The communication module 120 handles inputs received from the users for object identification, object mapping, and the like. The communication module 120 is capable of interacting with the internal component of the server 116 as well as with the client module 132. The communication module 120 interacts with the administrative module 122 and the client module 132.

The client module 132 handles centralized services for the users and authenticates the users; it further detects any change in user position/orientation change, handles user interaction input 138 and generates an output 140. It maintains a user profile 134, detects physical position and orientation of the user, receives user interaction input 138 and generates output 140.

The administrative module 122 has a sampler 128 that plays and records the music generated, it is also responsible to sample and synthesize the requests received from users (single/multiple). A mapper module 126 performs object identification and maps them to pre-defined objects 130. The mapper module 126 is further responsible for providing perspective sound input to the synthesizer 124 and assigning the location and size sequence parameters to the identified objects. Further, a storage medium stores the generated music for each user.

The sound generator module 112 works in real time based on input received from the object mapping module 110 and triggers the generation of sound based on receiving an identified object sound data from the server 116 in real time. Any motion change or new drawn patterns sent from object mapping module 110 causes the server 116 to send a corresponding sound file that can be played in real time. Accordingly, a user's moving fingers or hand gesture would generate sounds in real time based on the sound generator module 112. The sounds produced would keep on adding to already produced sounds and will create a music that could be recorded and replayed by the record and replay module 104. The generated sound is sent to ear worn device 114, which is heard by the user. Further, the record and replay module 104 on receiving an identified object sound data from the sound generator module 112 through the object mapping module 110, records the sound and stores the sound. The recorded file could be deleted, modified or played later.

Figure 1B:
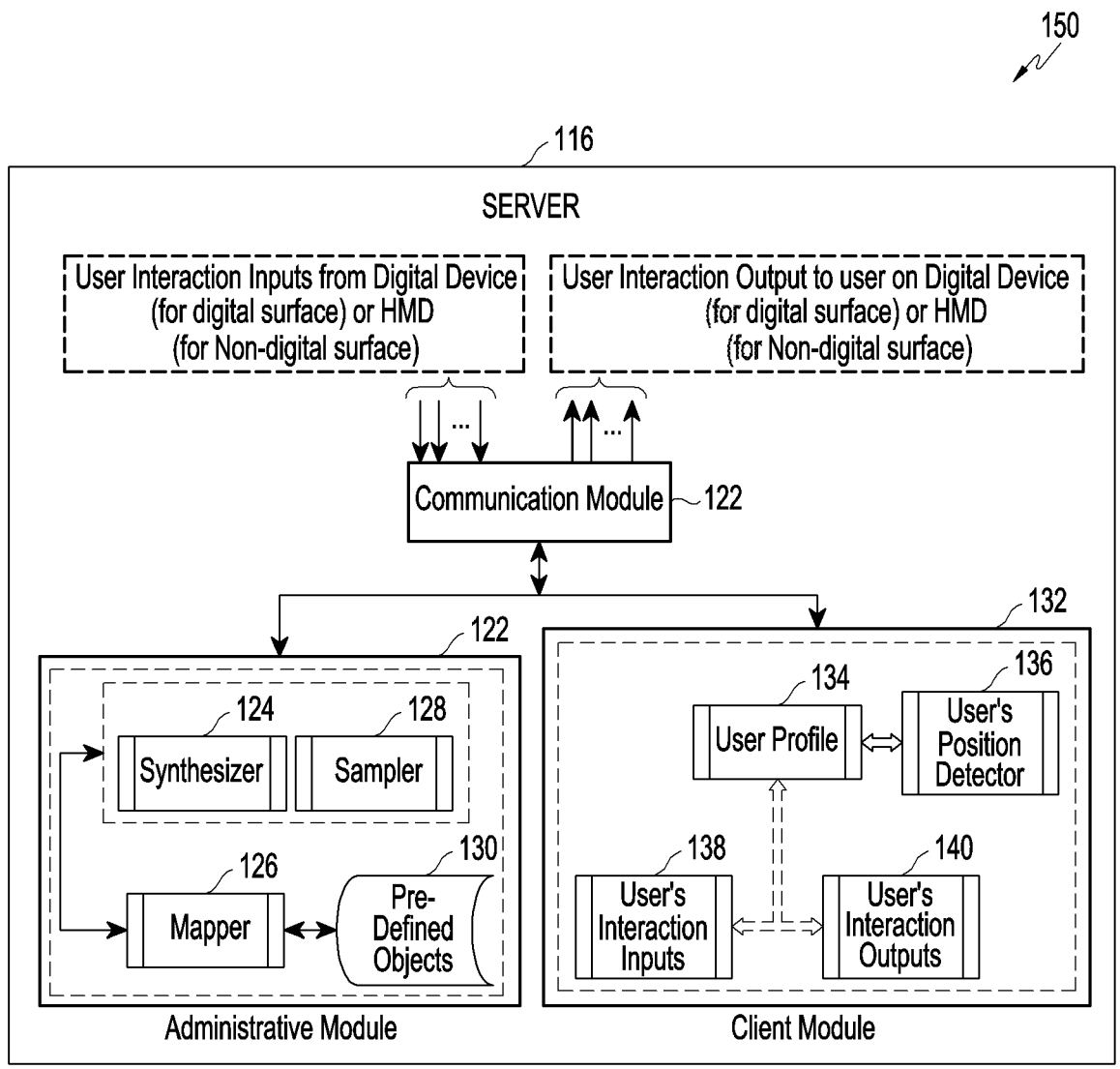
FIG. 1B illustrates an architecture of a server according to an embodiment of disclosure.

FIG. 1B illustrates an architecture of a server according to an embodiment of the disclosure.

Referring to FIG. 1B, a block diagram 150 of the server 116 is illustrated, and the server 116 provides a centralized device where information can be stored, manipulated, and accessed. The server 116 receives continuous data from the user side and the said request can be of two types, a request with drawn pattern image for pattern recognition and object identification where the drawn pattern ultimately becomes one object which has attributes such as music file, instrument type, and the like. The other request could be when a user extends the drawn pattern with more octaves or more objects so for each object the server 116 sends the corresponding mapped musical instrument notes set to the user. There is a communication module 120 which handles single user and multi user scenarios. The multi-user scenario is handled by creating a room on the server 116 for all user users who want to play the instrument along with other users in the room.

The communication module handles single/multiple user request simultaneously. The communication module receives inputs from the client for object identification and mapping. The module interacts with the internal component of the server 116 and also with the client outside. The module is main interface for the user to interact with the server 116. The communication module 120 provides communication services between the users of the system (both administrative and user clients) and the server 116. This module represents the part of the communications link that resides on the server 116.

The client module 132 handles centralized services related to users and is enabled to authenticate users, detect any user position/orientation change and handles continuous user interaction input 138 and generate output 140. The user profile 134 for every user is maintained at the client module 132 for access authentication, session handling, frequent request handling, and the like and the user database is maintained for historic records. The user positional detector logs in user's physical position or orientation for every user and any change in the parameters is immediately fed to the synthesis module for perspective change inclusion in the synthesized music output. For no change in the parameters, no change is fed to the perspective sound generation. The user interaction input 138 interacts with the drawn patterns on a client device and continuously updates the server 116 with its inputs. For each input from the client device, corresponding sounds are generated and octave unlocking would occur for new octave inputs. The user interaction output 140 is for the user interaction and results in a sound file being unlocked and shared by the server 116 with the client device. Also, the perspective based position/size parameters based synthesis output is shared with the user. So the user always listens to perspective based sound on the user's sound output medium.

According to an embodiment of the disclosure, the server 116 also includes the administrative 122 which further includes a sampler 128 to play and record the music generated by the sampler 128 module in a multi user environment. Since, each connected user to a room must listen to the same sound generated by the fusion of their respective instruments/objects, so the sampler 128 might play, record the trace to be shared with each of the connected client simultaneously. This module helps in sampling or synthesizing the multiple client request scenarios where each client is simultaneously playing an instrument mapped on the server 116. The user created music is sampled or synthesized to form a fused musical track just like an orchestra being played and also handles the music generation in multiple user scenarios. The room containing multiple instruments being played by each member of the accessed room is fused together to create a fused music. The user accessing this room listens to the fused music created by sampler 128 on their respective devices through the communication module 120.

According to an embodiment of the disclosure, a mapper module 126 performs object identification through pattern matching. On receiving a pattern from a client, the mapper module 126 tries to match the received object pattern with the predefined object's pattern. The mapper module 126 identifies the number of objects, as there could be multiple objects in the pre-processed image received by the server 116. On a successful match of each received objects with pre-defined patterns on the server 116 side, the server 116 identifies the instrument(s) or object(s) and sends the corresponding music file(s) to the user. The user can further draw patterns, to which the mapper module 126, identifies whether it is an extension of already drawn pattern or a new pattern of a new object. So either the octave unlocking takes place or the new object music is shared with the client. The mapper is also responsible for perspective sound input to the synthesizer 124 as it process the input images and identifies each object and also assigns the location and size sequence parameters to each identified object. Further, the size sequence shows the order of identified objects in decreasing order of their relative sizes. Thus, as the drawing is made and individual objects are drawn, their sizes are relatively compared and a sequence number is assigned to each object. So, a sequence number 1 will have a dominating sound in the synthesized musical track as compared to sequence number 2 object which in turn will have more dominance than object with greater sequences numbers henceforth. The sequence order assigned keeps on changing with more objects added to the drawing and their relative comparison with other objects drawn on the drawing area. The location sequence maps the identified objects with respect to a central reference point in an x-y axis. Thus, as the drawing is made and individual objects are drawn, their relative locations are relatively compared and a central reference point is calculated which in turn decides the relative location of each object with respect to that central location in x-y axis. So a relative value is assigned to each object which will have a perspective based directional sound in the synthesized musical track. So an object drawn at location sequence 4 will have more dominant output from Right channel of sound output device as compared to location sequence 0 object which will have equal output at both left and right channels and finally a dominant sound on the Left channel from the object with location sequence as −4. The sequence order assigned keeps on changing with more objects added to the drawing and their relative comparison with other objects drawn on the drawing area. Location sequence is assigned with respect to a reference point at the center of a captured frame and relative location of each identified object with respect to the reference point. The Storage module stores the generated music corresponding to each user and also stores each user's profile data to be used for future caching. For multiple users, it stores the sampled music from each client.

In an embodiment of the disclosure, a user drawn pattern on a surface would be detected by an intermediate object identifier device, which may include a head mounted device with camera sensor, a wrist worn device with motion detection, a camera, a pen and the like. The drawn image is then mapped with one of the predefined set of musical instruments or certain objects sounds such as flowing river, chirping birds, or a background score as per the drawn pattern. These all sounds are generated in real time. So a user would be drawing and listening to the mapped generated sounds at the same time giving a real-life experience. The user can also delete or replace the drawing to remove the generated sounds. A server (116) with all predefined objects and their respective sounds would communicate in real time with the user's devices. Accordingly, the musical instruments are mapped to the middle octave and if a user wants to generate sounds from lower notes, he has to draw the lower portion of the instrument. The right side octaves would be mapped onto the server 116 as and when it is drawn by the user. The keys pressed and played by a user would be mapped to one of the keys or strings of real size instrument at the server 116 side in the background. A user listening to the sound from the server 116 would adjust his fingers by pressing accordingly and would calibrate the musical notes accordingly. Any further extension of the drawing shall include other octave/keys/strings of the instrument.

Figure 2:
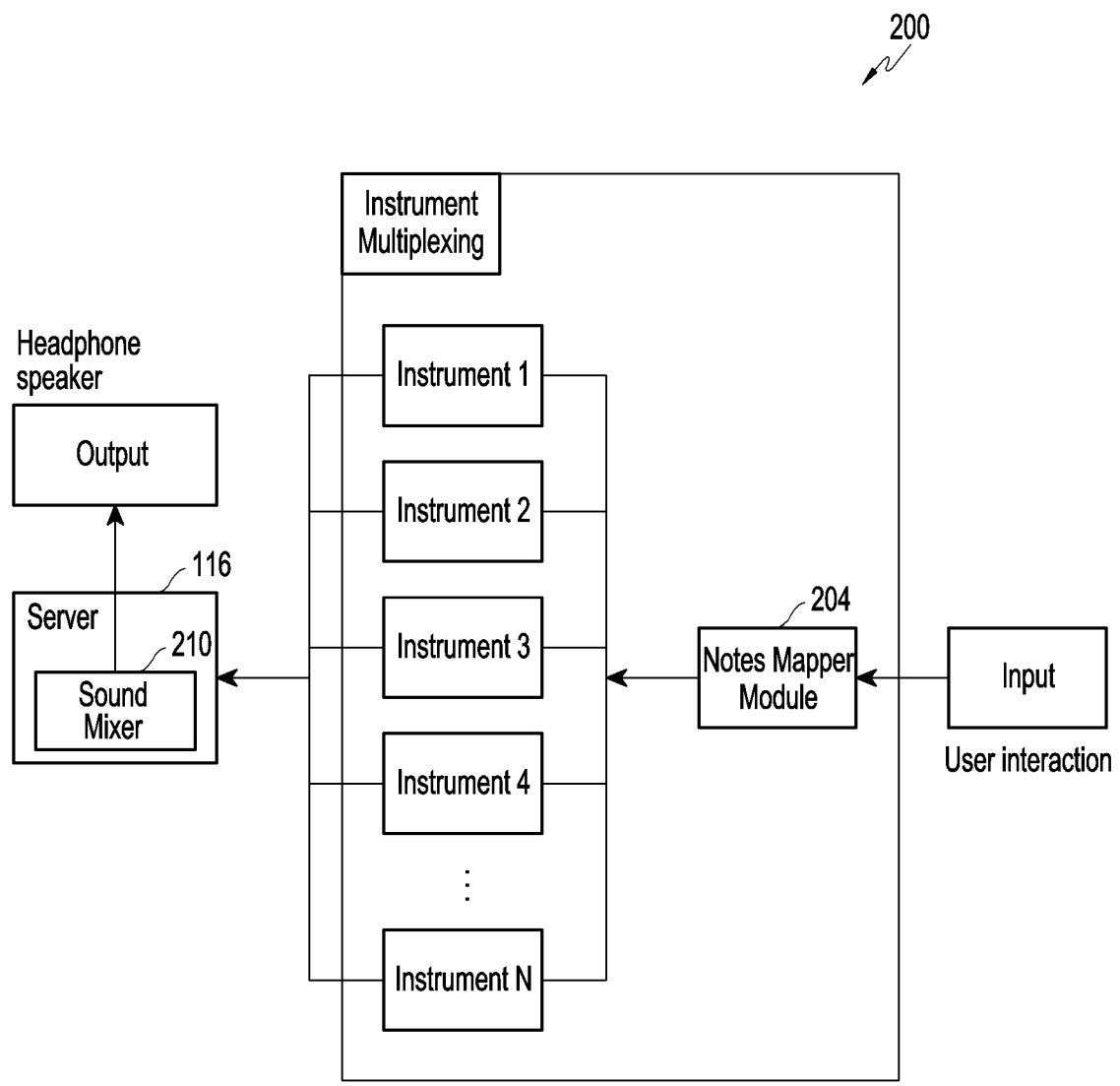
FIG. 2 illustrates object multiplexing architecture according to an embodiment of the disclosure.

FIG. 2 illustrates an object multiplexing architecture according to an embodiment of the disclosure.

Referring to FIG. 2, an object multiplexing architecture 200 is illustrated, wherein each input given to an instrument is simultaneously mapped with single/multiple instruments. For example, if a user has drawn 3 instruments identified as piano, flute and drums, and all the instruments are in an enabled state, then a single interaction with a piano shall result in output generated by flute and drums at the same time. Also, if piano is disabled then the sound of enabled instruments such as drum and flute will be generated based on the input notes given to piano. Each input to an instrument is one to one mapped with an octave key of all the instruments. In the notes mapper module 204, each input to the instrument is mapped with one or multiple instruments based on the current mode of instruments. So, single input may generate output from multiple instruments all being played with respect to the input key note. Input mapper sends input note to each enabled instrument corresponding to which instrument key notes information for every instrument is sent to sound mixer 210.

The sound mixer 210 generates note sound based on the input key for each instrument. Each sound mapped with input is mixed by sound mixer 210 to generate single track music. The synthesizer 124 fuses each instrument's sound key note and generates a single music track which is played at the client's output device.

Figure 3:
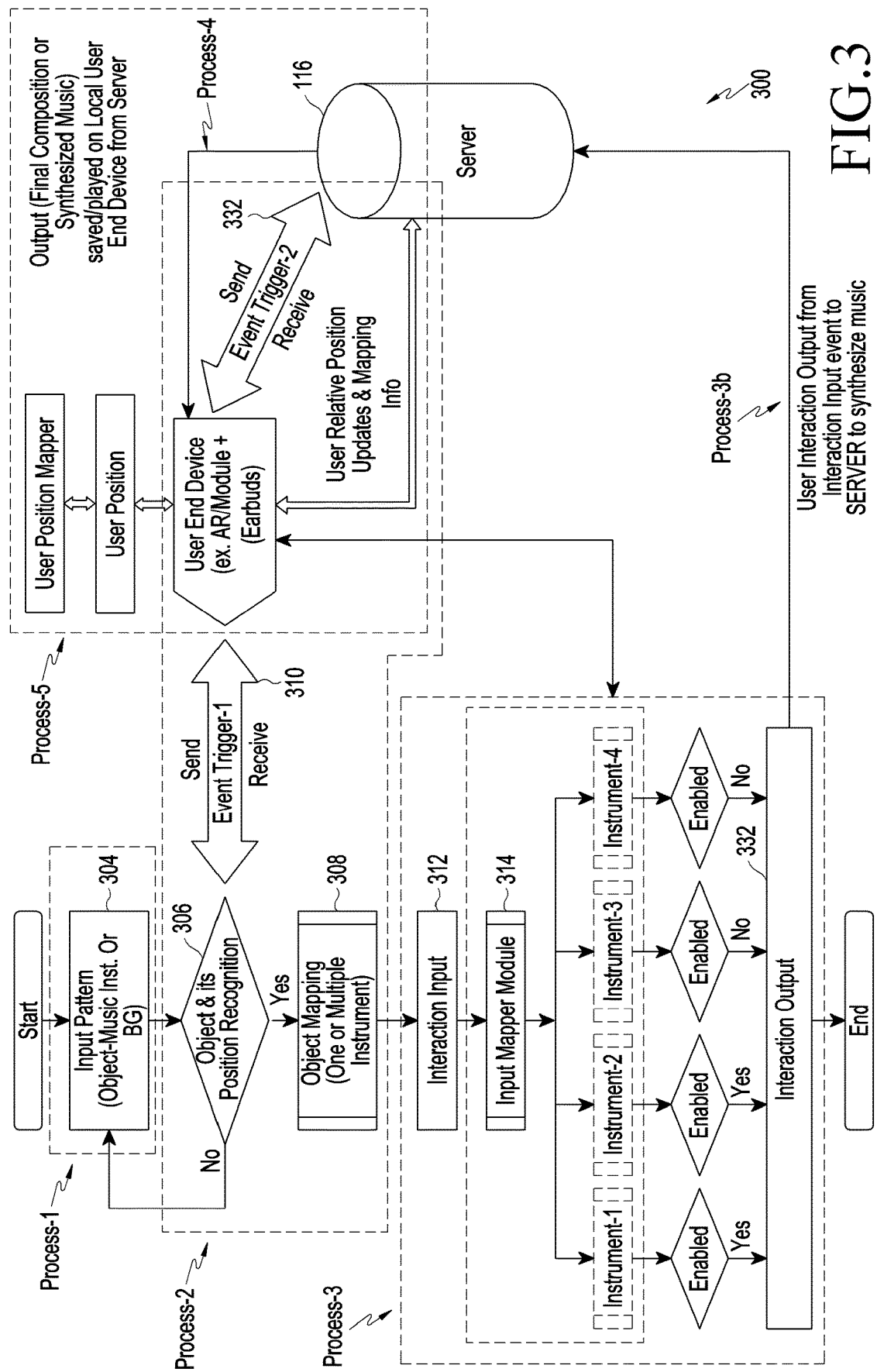
FIG. 3 is flow chart illustrating creating and synthesizing of music according to an embodiment of the disclosure.

FIG. 3 is flow chart illustrating creating and synthesizing of music according to an embodiment of the disclosure.

Referring to FIG. 3, a flow chart 300 illustrates various processes that illustrate the operation of the device. The process 1 includes drawing of an image, capturing a printed image, and the like in operation 304. A predefined object is coupled to a printed image or a hand drawn pattern as per the user's preference. The process 2 includes object identification, object position identification module 306 and object mapping module 308, which involves a trigger 310 being sent to the server 116 through object position identification module 306 with a preprocessed image. For the object identification, the server 116 identifies individual objects in the received image through pattern recognition. On a successful match, it sends back the identified object and all its attribute information with the client. The object position identification module 306 identifies the relative position of each object and maps for perspective sound generation. The object mapping module 308 identifies object from the input that are mapped to unique entities (e.g., a musical instrument, animal, bird or physical objects such as a river).

According to an embodiment of the disclosure, further processes include process 3, which includes user interaction and sound generation based on the user interaction input 138 and sound generation according to the interaction inputs on enabled instrument. The sound generation further involves process 3a for input interaction 312 and instrument mapping 314, i.e. after successful identification and mapping of the hand drawn pattern or printed object inputs are mapped with single or multiple instruments. Based on the current state of the instrument (i.e., enabled/disabled) and current interaction object, each input key can be mapped with a single or multiple musical instruments, and process 3b includes the multiplexed input sent for sound generation to the server 116 (Interaction Output 332 to server 116 for mixing).

According to another embodiment of the disclosure, the process 4 shows that the server 116 receives an interaction input and user position input, synthesizes the music with all the input instruments/object sounds, and outputs the synthesized music to the user device (e.g., speakers or headphones 206). Further, the process 5 shows the user relative position detection which includes user relative position updates and mapping information. The user relative position updates identify a perspective input from the user to the server 116 based on the head movement of a user and relative positions of drawn objects. Further, user relative position updates and mapping information updates the user position on detecting any change in the user position and synthesizes the perspective based music sound and sends back to the user.

Figure 4:
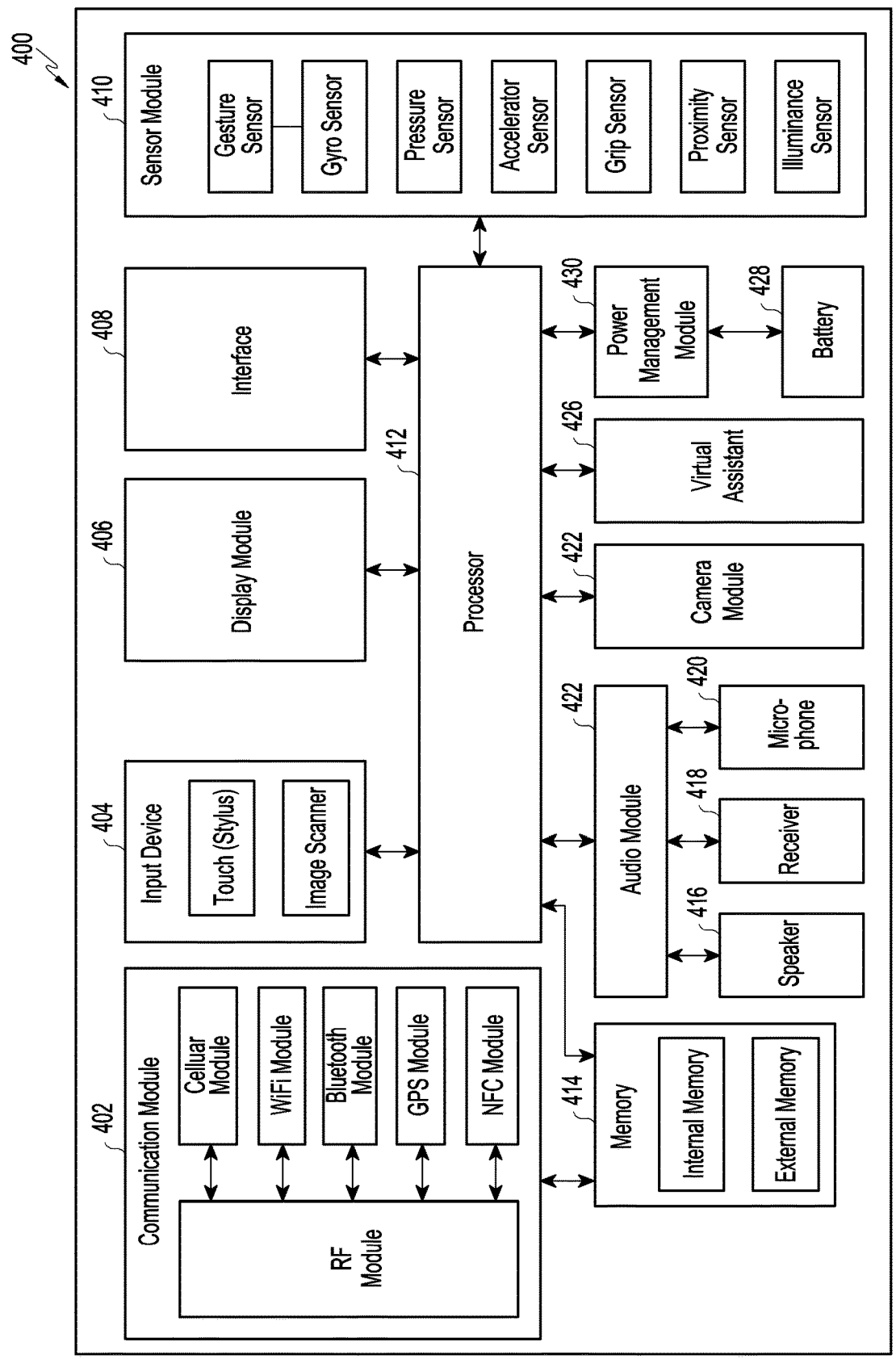
FIG. 4 illustrates a system architecture of a digital device for detecting any object on the surface according to an embodiment of the disclosure.

FIG. 4 illustrates a system architecture of a digital device for detecting any object on the surface according to an embodiment of the disclosure.

Referring to FIG. 4, the a block diagram 400 of a device includes a processor 412 to execute system instructions, a memory 414 to store executable applications, APIs, middle wares and the kernel, an application control module to manage running applications, an input/output interface for interaction with user, a communication module 402 for the purpose of communication with other devices (paired or connected devices) or a remote server and a display module 406 to display visual information, an interface 408 to connect with other devices, a virtual assistant (VA) module 426 to receive input from command given through microphone and process that input to identify an object drawing request. There are multiple sensors in the device, in the sensor module 410 that send triggers to the device on detection of various inputs such as touch, motion detection, gesture recognition, and the like. The power module 430 keeps the power management in check. A camera module 422 captures images on even trigger from sensors. Interface modules to pair the device with other inputs if required.

According to an embodiment of the disclosure, the communication module 402 is the interface between the user device and the remote server. The user device communicates with the server 116 in real-time. For each trigger sent by sensor module 410 at user side, the communication module 402 sends the preprocessed image data and user's positional data to the server 116 for pattern recognition, object mapping and perspective sound synthesis. On successful mapping, it receives sound data from the server 116 which is stored in the memory 414. For any input received by the input device 404, if the input is well within the already unlocked portion of the mapped object, then it uses the music data stored in the memory 414 and not required to connect with the server 116 or it communicates with the server 116 for sending other music data not currently available with the user device. The various means of communication that are used includes Wi-Fi, cellular, and the like.

The sensor module 410 receives device position and orientation from various sources such as gyro sensor, accelerometer sensor and the like. The device location depends on the user's head position and thus with user's head movement the device's position parameters also change. Thus, position parameters when changed are updated at the server 116 end. The server 116 based on the position parameters synthesizes the output sound with user perspective parameters added to the instrument's sound. For example, a man is playing a piano and a guitar is drawn on right side of the piano. So, based on the position the perspective sound shall be heard likewise from the speakers or headphones 206. When the man moves his 30 head towards right side, the perspective sound makes the guitar sound more dominant over the piano's sound.

The audio module 422, which is connected to speakers 416, receiver 418, and microphone 420, receives perspective sound based on relative location and size of each of the mapped objects drawn on the surface tagged with their respective audio stream from the server 116. Thus, perspective sound is generated as the output audio stream is fed to different channels of the speakers or headphones 206 to produce a surround sound effect. For example, consider a trumpet is drawn on the left side of a piano and a guitar is drawn on the right side of the piano. The sound shall be heard likewise from the speakers or headphones 206. Now, consider that the guitar drawn is smaller than the piano, it will be considered as a relatively farther sound and the guitar drawn bigger in size than piano will be more dominantly heard in the output on the speakers 416.

In an embodiment of the disclosure, the camera module 422 captures images in front of the device which includes hand drawn patterns or a predefined template. The object mapping module 110 receives the input parameters on the basis of the relative location and size of each of the mapped objects. Thus, relative location of each object and their positional parameters contribute to adding the perspective sound generation.

The VA module 426 receives input from command given through microphone 420 and processes that input to identify an object drawing request. Based on the command given by user, the VA draws an object on the screen in the form of musical instrument or any background object. The user further gives inputs regarding position of the drawn object within the frame relative to other objects in multiple instrument scenarios. A user might further give commands to stop drawing and is enabled to interact with the partially drawn object anytime.

According to another embodiment of the disclosure, the memory 414 stores the pre-processed image data till it gets recognized by the server 116 and is mapped with the object. The mapped objects are stored in the memory 414 along with their corresponding music files and any future reference to the stored data can be directly accessed if it is present in the local memory. Alternatively, the server 116 is referred. If there is no change in the user's positional data and object relative location data then perspective sound is referred directly from the stored data. The server 116 triggers the updated music data on detecting any object's relative size or position change or the user's positional/orientation change. Each input on an object is mapped with single or multiple objects, so mapping data is also stored in the memory 414. The synthesized music is played on the device and could also be stored when recorded and could be replayed henceforth.

In an embodiment, the operations related to the music sampler element includes the detection of motion of hand which further includes a user wearing a device fitted with motion sensor and any motion in front of the user is detected by the device. The proximity sensor and motion sensor are enabled to collectively detect motion in front of the device. Further, the element includes the detection of objects drawn by hand, wherein, if the drawing is done on a paper or any other non-digital surface, the motion detection signal is sent to the camera module 422 to take picture and pre-processes for any object drawn on the surface. The pattern recognition happens at the server 116 side. So the camera just sends the pre-processed image to the server 116 for object detection and mapping. The detected object could be a musical instrument or a background environment used for ambience creation. The attributes of the generated environmental sound shall be based on the locality of the objects in the drawings, for example, the objects closer will be dominant in sound as compared to farther objects. The objects on the left will be more audible on the left hand side of the speakers or headphones 206 and likewise for right side objects. The drawings drawn on a digital surface have pre-defined patterns stored in the device. So, the image of the pattern could be directly shared with the server 116.

Also, the mapping of drawn patterns with one of the predefined musical instruments includes receiving the server 116 images from the user. The images includes hand drawn pattern of an object. The server 116 checks with its pre-defined object database if it matches with one of the object and the Object identification and mapping of the middle octave of a portion of instrument drawn is completed. On successful detection of a musical instrument, the server 116 checks if a portion of the instrument is drawn and in case the portion is drawn, it sends the music file corresponding to the middle octave of the instrument that is drawn. For mapping the whole instrument, the drawing should contain all the octaves and if it is detected that the entire instrument is drawn, then the entire musical note file is shared with the user. For any other objects, such as river, bird etc. corresponding music files are shared. For the generation of one of the mapped musical notes on the audio device, the music is generated corresponding to the instrument drawn and further, on every interaction of user with the drawn patterns, the process is continuously repeated.

Figure 5A:
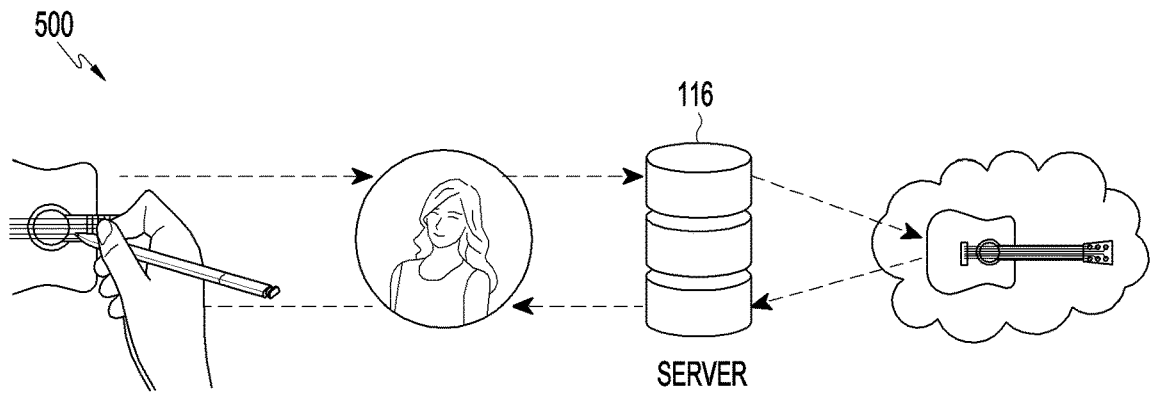
FIG. 5A illustrates a mapping of a drawn pattern to a pre-defined object according to an embodiment of the disclosure.

FIG. 5A illustrates mapping of a drawn pattern to a pre-defined object 500. A user draws a partial shape of an object (preferably a music instrument) and as the user draws the shape of the object, the Intermediate Object Identifier Device (which includes a camera, a smart phone, a smart jewelry such as camera enabled smart pendant, a smart pen, and the like) sends the information of drawn shape to the server 116 which is enabled to identify the drawn shape in accordance with the pre-defined object. The server 116 sends the acknowledgment to the user's Intermediate Object Identifier Device which confirms whether the object is identified or not. In case the object (for example, a guitar, piano, background sound, and the like) is identified then the user can interact with the identified device as the server 116 maps it to a predefined object. However, in case the object is not identified, the user can continue drawing the shape while the Intermediate Object Identifier Device keeps tracking the object being drawn in real-time.

According to an embodiment of the disclosure, as soon as the intermediate object identifier device identifies the object, the intermediate object identifier device starts sending the information of drawn shape to the server 116 and the server 116 identifies the drawn shape and maps the drawn shape with the pre-defined object and unlocks all the octaves of the music instrument drawn. For example, if the user draws a guitar, the server identifies the object and maps it to the pre-defined object as guitar. The user starts interacting with the guitar. Subsequently, an object, such as a guitar is then mapped to a pre-defined object and the server 116 unlocking all the octaves of the music instrument. The user can interact with the music instrument and synthesize music from the music instrument. The music instrument provides the user with real-life playing experience.

Figure 5B:
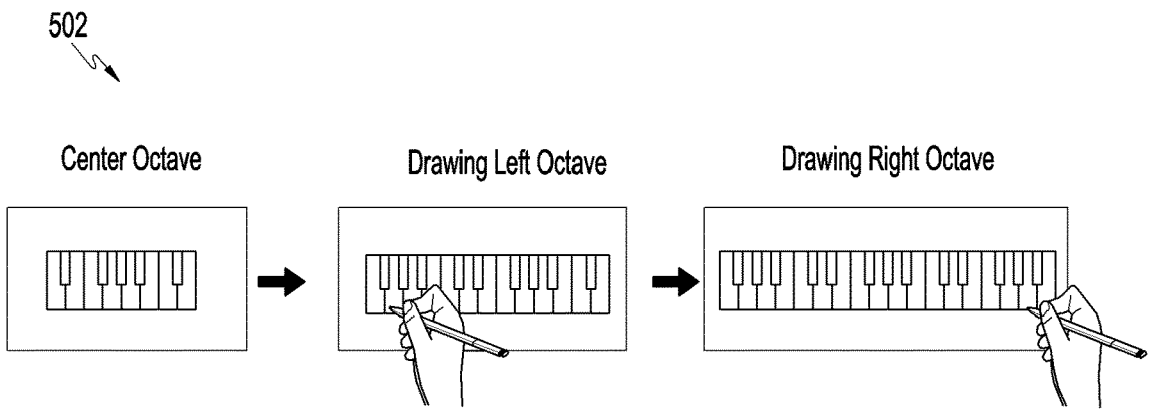
FIG. 5B illustrates unlocking of octaves according to an embodiment of the disclosure.

FIG. 5B illustrates unlocking of octaves according to an embodiment of the disclosure.

Referring to FIG. 5B, a user draws the middle octave of keyboard/piano on an electronic surface/non-electronic surface or a digital surface to unlock music octaves 502. The user partially draws few keys on the surface and the server 116 identifies the drawn object and maps it to the pre-defined musical instrument. The middle octaves of the keyboard/piano, i.e. (C4-C5) 1 gestreept are then unlocked. The user then interacts with the music instrument once the mapping is complete.

According to an embodiment of the disclosure, the user then draws the left octave of the music instrument (keyboard), i.e. left side octave from the middle octave, C4-C5 (1 gestreept). Once the octave is unlocked, the user can play music and create a music track on the said music instrument.

According to an embodiment of the disclosure, the user further draws the right octave of the music instrument (e.g., a keyboard), i.e. right side octave from the middle octave. The user draws the right octave and the device is enabled to identify the octave in real time. Once the octave is identified, it is unlocked and mapped to the pre-defined instrument's right octave. The user can create a complete music track with the entire instrument unlocked.

Figure 5C:
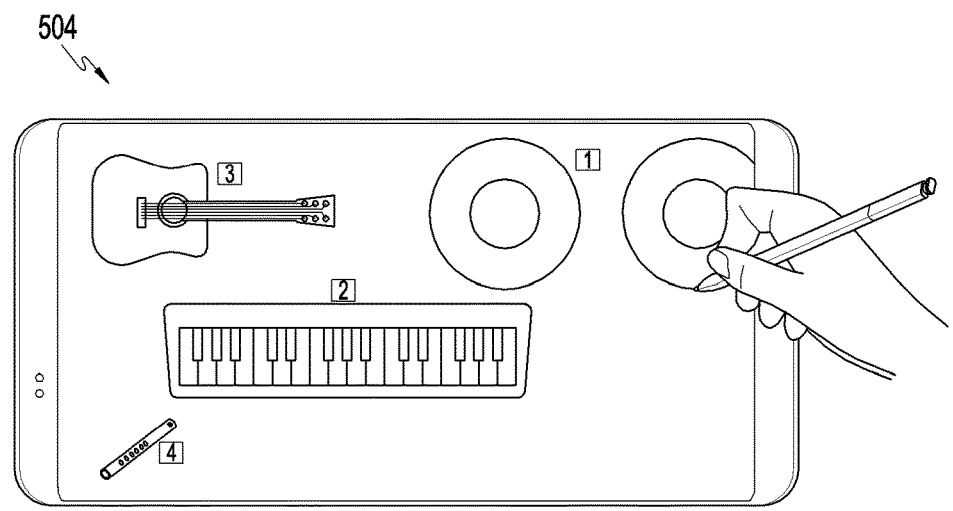
FIG. 5C illustrates a user interacting with multiple instruments according to an embodiment of the disclosure.

FIG. 5C illustrates a user interacting with multiple instruments according to an embodiment of the disclosure.

Referring to FIG. 5C, while multiple instruments 504 are displayed, the user draws a keyboard along with a guitar, flute and drums. The said music instruments are mapped to the pre-defined objects 130 as keyboard, guitar, flute and drums using the mapper module 126. The octaves of these instruments are being unlocked in this process in real-time by the mapper module 126. Based on the size and position of these instruments, the instruments are accordingly numbered as 1, 2, 3 and 4 (for example, based on the size, 1: drums, 2: keyboard, 3: guitar and 4: flute), the mapper module 126 assigns the size sequence and location sequence on the basis of the size and location of the mapped instruments. Once, all the music instruments are mapped and octaves are unlocked for the same, the user interacts with the instruments and the instruments produce sounds based on their size, position and location. In case, the user interacts with the guitar, he will receive sound from top left, i.e., sound on the left side will be more prominent while the flute will produce sound from bottom left, which will be less prominent than the flute's sound. Thus, the sound is based on the perspective position of the devices and the volume is based on the size and position. Thus, a bigger drawn object will produce louder sound and smaller drawn object will produce lower volume.

Figure 5D:
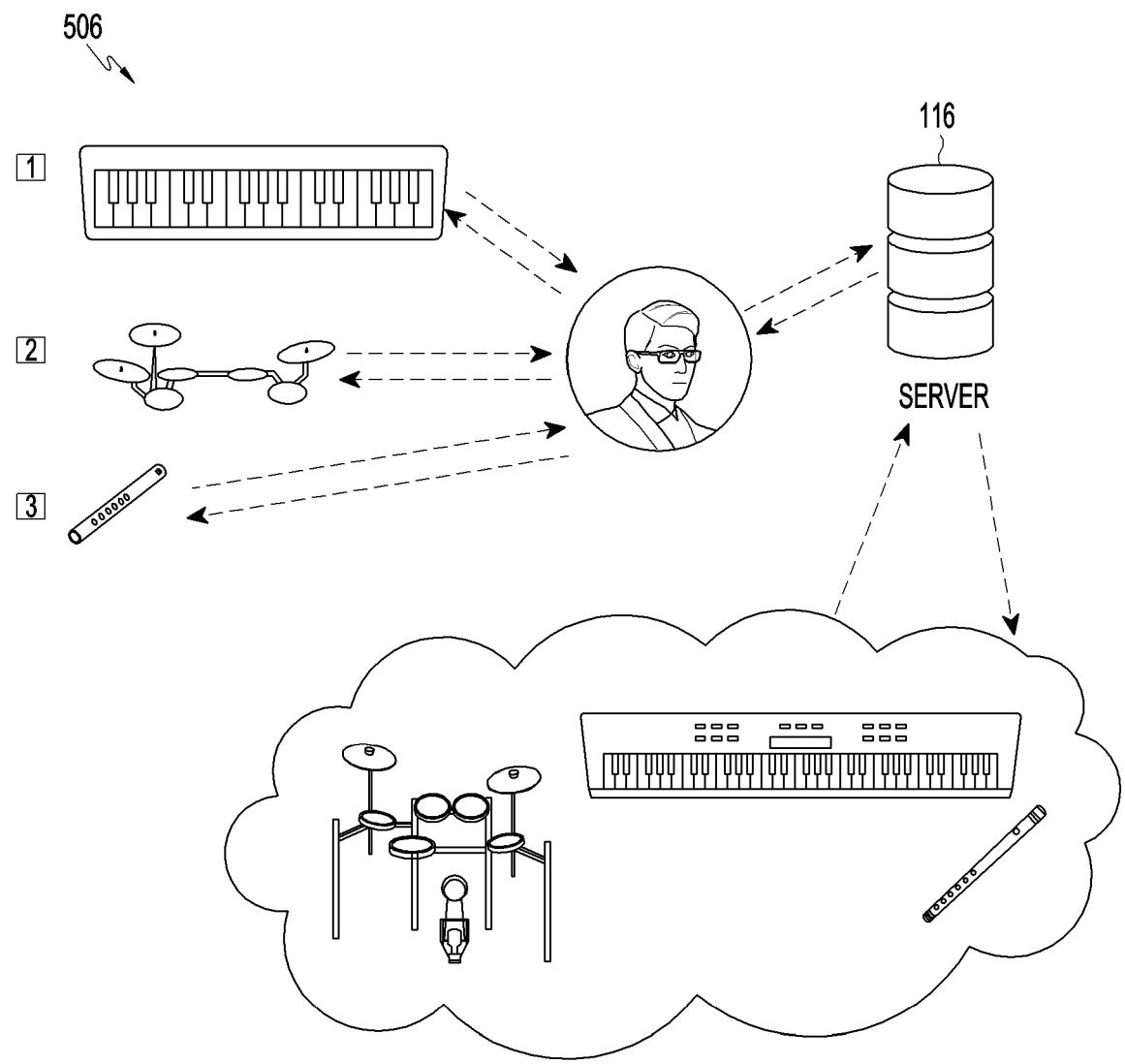
FIG. 5D illustrates mapping of multiple instruments according to an embodiment of the disclosure.

FIG. 5D illustrates mapping of multiple instruments according to an embodiment of the disclosure.

Referring to FIG. 5D, the user maps multiple instruments to create a symphony wherein he maps a keyboard, drums and a flute. The device marks these instruments as 1, 2 and 3 on the basis of size and accordingly the position of these instruments is also mapped.

According to an embodiment of the disclosure, the user knows how to play keyboard but doesn't know how to play drums and flute. So, he can enable all the controls of multiple instruments 506, which include the drums and flute on the keyboard. Therefore, a keyboard will be the interaction object and drums and flute will be enabled. The notes mapper module in the server 116 will map all the notes of drums and flute to the keyboard and unlock all the octaves of drums and flute on the keyboard as per the position of the instruments. The enabled instrument may also be disabled as per the user's will. The user with the help of the intermediate object identifier device can input interactions to the instruments placed. For example, the user may input interactions in the middle octave to play the keyboard's sound, in the left octave to generate the sound of drums and in the right octave to generate the sound of a flute. Thus, on the basis of the position and size of the instruments, perspective sound is generated and the user only by interacting with the keyboard is capable of generating sound of both drums and flute.

Figure 5E:
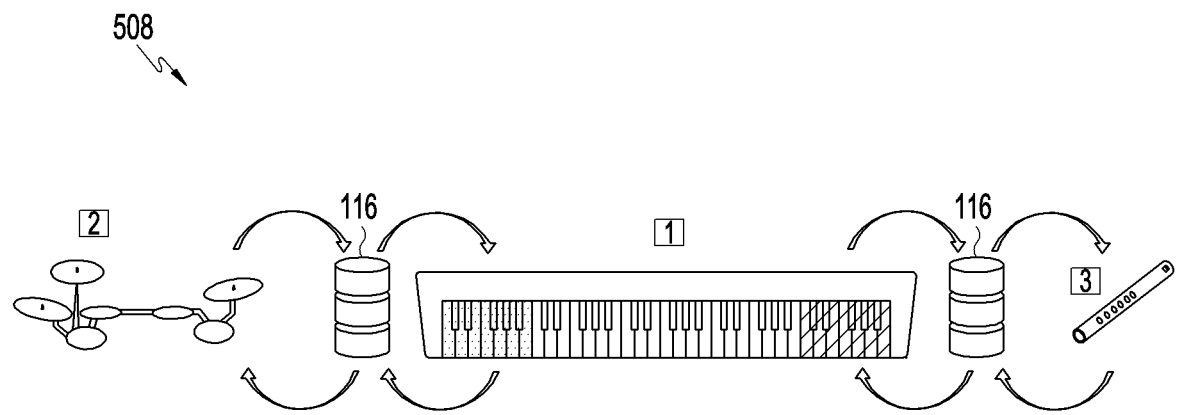
FIG. 5E illustrates octave mapping of multiple instruments according to an embodiment of the disclosure.

FIG. 5E illustrates octave mapping of multiple instruments according to an embodiment of the disclosure.

Referring to FIG. 5E, octave mapping on multiple instruments 508 s illustrated. That is, when a user doesn't know how to play drum and flute and can only play keyboard, the user may provide all drum and flute controls on keyboard.

In an embodiment of the disclosure, the user marks "label 1 object (keyboard)" as an "interaction object" and then marks "label 2 and label 3 object (drum and flute)" as an "enabled Instrument(s)." The notes mapper module 204 in the server 116 maps all the and unlock all the octave of drum and flute on the keyboard as per their position likewise left side octave unlocked and mapped to the drum and right side octave unlocked and mapped to flute and the middle octave unlocked for the keyboard. The enabled instrument (drum and flute) with enabled/disabled mode at time with one interaction sound of the corresponding notes in the enabled object/s shall be generated by using interaction object or instrument.

According to an embodiment of the disclosure, the user can play/interact with "label 1 object (keyboard)" and it generates the sound of "label 1 object (keyboard)" by interacting with middle octave and "label 2 object (drum)" by interacting with left side octave of keyboard and "label 3 object (flute)" by interacting with right side octave of keyboard. Although the user interacts only with keyboard which is drawn on the center of the page, but since it's octave notes are mapped with multiple instrument's notes like left side octave is mapped with drum and right side octave is mapped with Flute and middle octave unlocked for keyboard, so as the user interacts with the keyboard's keys, the application generates the sound of drum, keyboard and flute and based on the position and size of drum, keyboard and flute it is enabled to generate the perspective sound effects. The drum is drawn on the left side of the page and, therefore, the user gets the sound of drum from the left side. The flute is drawn on the right side of the page and is smallest in size so it generates sound accordingly. The keyboard is drawn in the center of the page and bigger in the size and the application generates sound according to position and size. Accordingly, the user can create the live symphony by using multiple instruments.

Figure 5F:
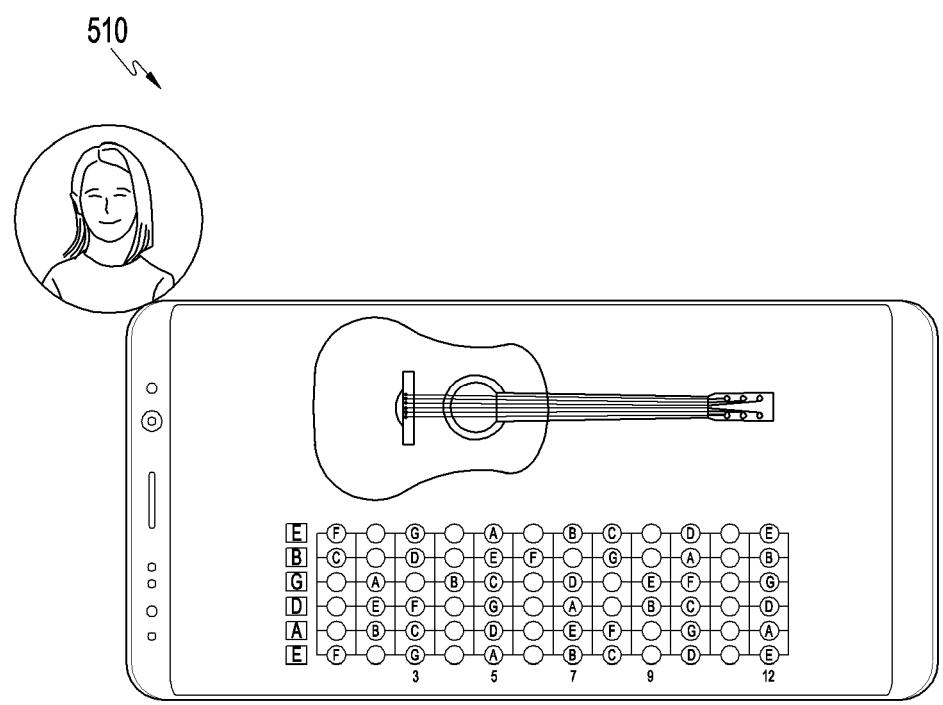
FIG. 5F illustrates mapping of notes of an instrument to shapes according to an embodiment of the disclosure.

FIG. 5F illustrates mapping of notes of an instrument to shapes according to an embodiment of the disclosure.

Referring to FIG. 5F, when a user doesn't know how to play an instrument, the user can map the notes of the instrument as shapes 510 and is capable of interacting with to play and learn the instruments. The user may draw a guitar and the shapes (i.e. the notes of the guitar are loaded as shapes). As such, the user is enabled to touch the shapes that are already mapped to the guitar Notes and thus, as the user touches the shapes, the output sound is that of a guitar enabling the user to learn and play guitar.

Figure 5G:
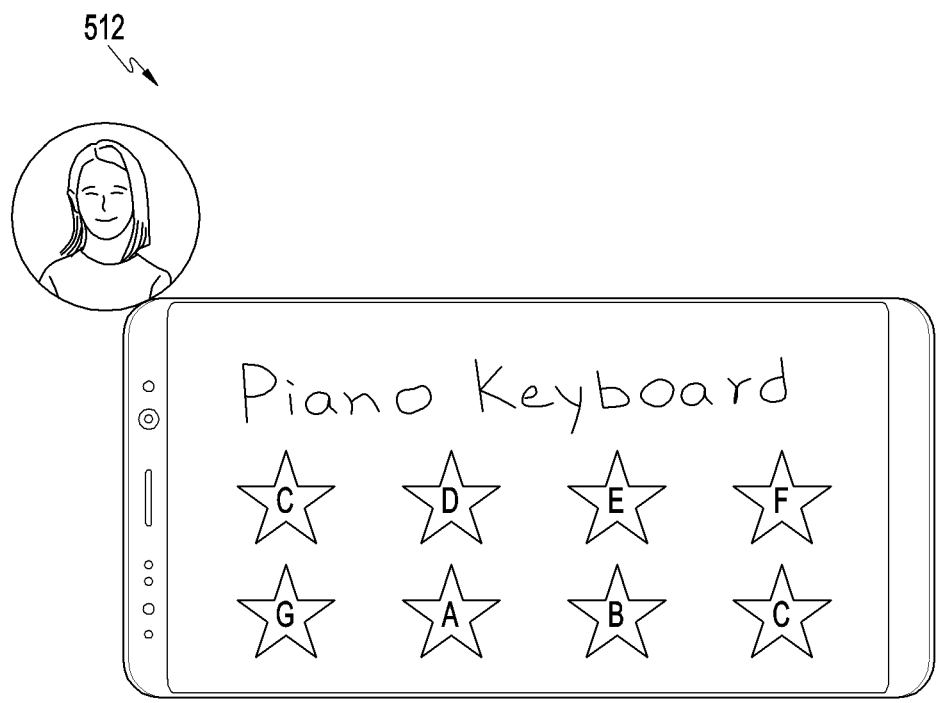
FIG. 5G illustrates mapping of notes of an instrument to loaded shape according to an embodiment of the disclosure.

FIG. 5G illustrates mapping of notes of an instrument to loaded shape according to an embodiment of the disclosure.

Referring to FIG. 5G, when the user doesn't know how to play a keyboard, the user cab load some shapes 512 which will be mapped to the keyboard notes and the shapes to the keyboards and unlock the octave of the mapped shapes. After the mapping the user starts playing keyboard by touching the loaded shape, since they are mapped with the keyboard notes so as the user touches the mapped shapes the Keyboard Sound is produced.

Figure 6A:
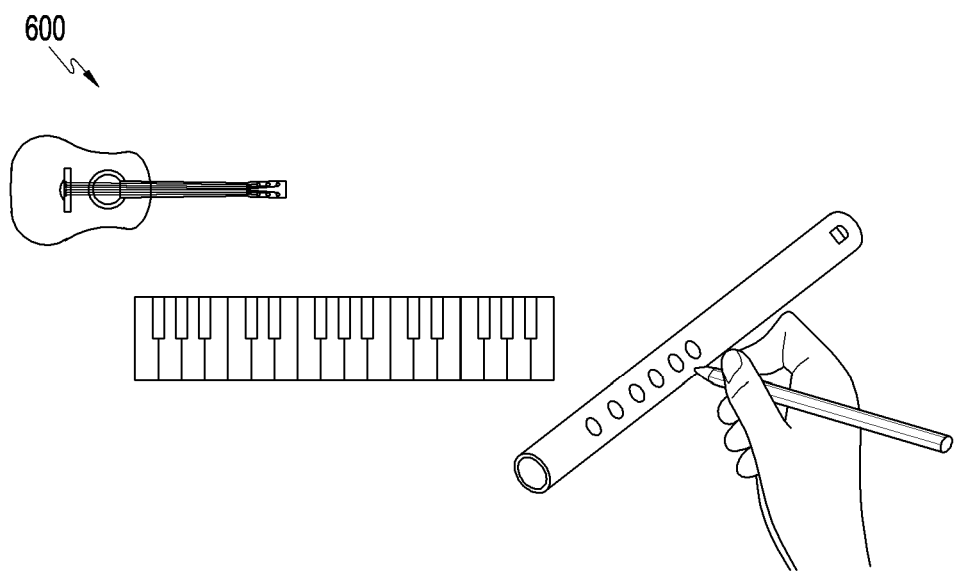
FIG. 6A illustrates perspective based sound generation according to an embodiment of the disclosure.

FIG. 6A illustrates perspective based sound generation according to an embodiment of the disclosure.

Referring to FIG. 6A, the size sequence shows the order of identified objects in decreasing order of their relative sizes for perspective based sound generation 600. Thus, as individual objects are drawn, their sizes are relatively compared and a sequence number is assigned to each instrument. So a sequence number 1 will have a dominating sound in the synthesized musical track as compared to sequence number 2 object, which in turn will have more dominance than instrument with greater sequences numbers henceforth. The sequence order assigned keeps on changing with more objects added to the drawing and their relative comparison with other objects drawn on the drawing area.

According to an embodiment of the disclosure, the location sequence maps the identified objects with respect to their central reference point in an x-y axis. Thus, as individual objects are drawn, their relative locations are relatively compared and a central reference point is calculated which in turn decides the relative location of each object with respect to that central location in x-y axis. So a relative value is assigned to each object which will have a perspective based directional sound in the synthesized musical track. So a flute drawn at location sequence 4 will have more dominant output from Right channel of sound output device as compared to location sequence 0 object which will have equal output at both left and right channels and finally a dominant sound on the Left channel from the object with location sequence as −4. The sequence order assigned keeps on changing with more objects added to the drawing and their relative comparison with other objects drawn.

Figure 6B:
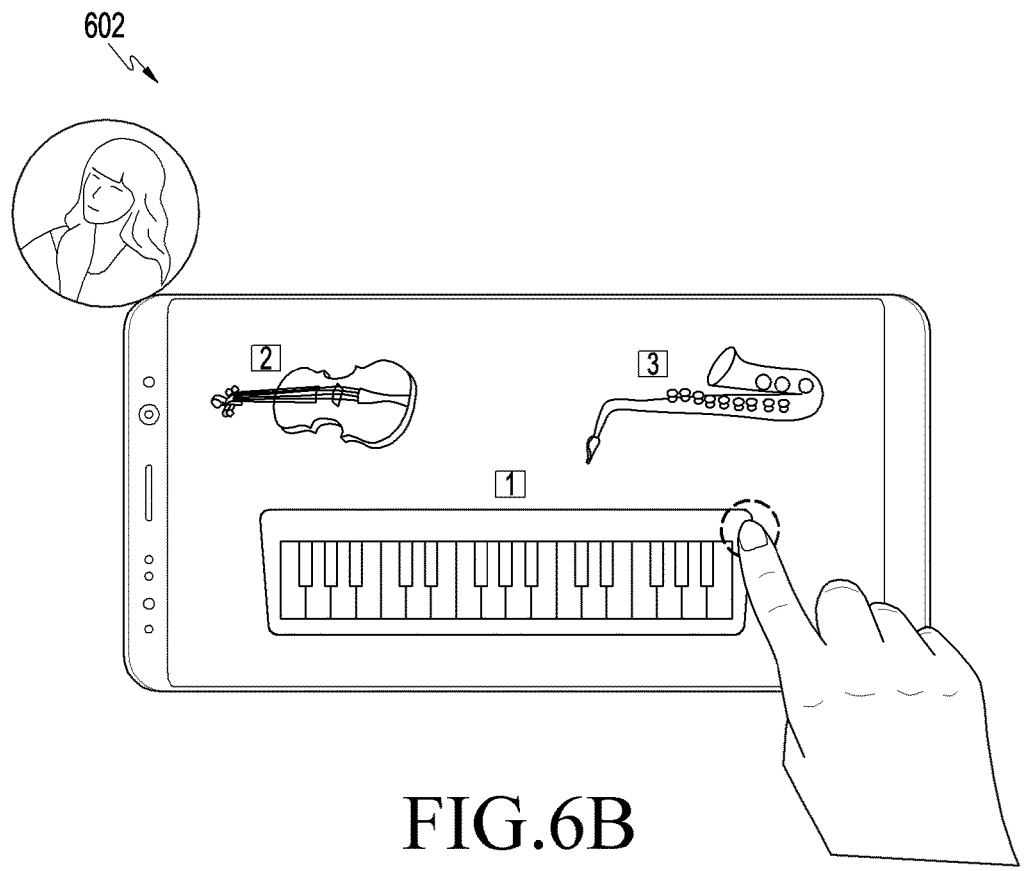
FIG. 6B illustrates an example of perspective sound generation on the basis of size and location of instruments according to an embodiment of the disclosure.

FIG. 6B illustrates an example of perspective sound generation on the basis of size and location of instruments according to an embodiment of the disclosure.

Referring to FIG. 6B, once the instruments 602 (e.g., a violin, a saxophone and a keyboard) are mapped using a mapper module 126, the user interacts with them and they produce perspective sounds effects as per their sizes and locations, the size and location sequence is also assigned by the mapper module 126. For example, if the user plays Violin, the sound appears to be generated from the top left side of the device, which means that the sound on the left side of the device will be more prominent and if the user plays Saxophone than sound appears to be generated from the top right corner, which means that the sound on the right side of the device will be more prominent, based on the position and size of the objects/instruments. When the user interacts with the Keyboard placed in the center of the device, the sound received is louder than other musical instruments because of the size which is bigger than other musical instruments. Accordingly, music instruments play the perspective sound effects on the basis of their size and positions.

Figure 6C:
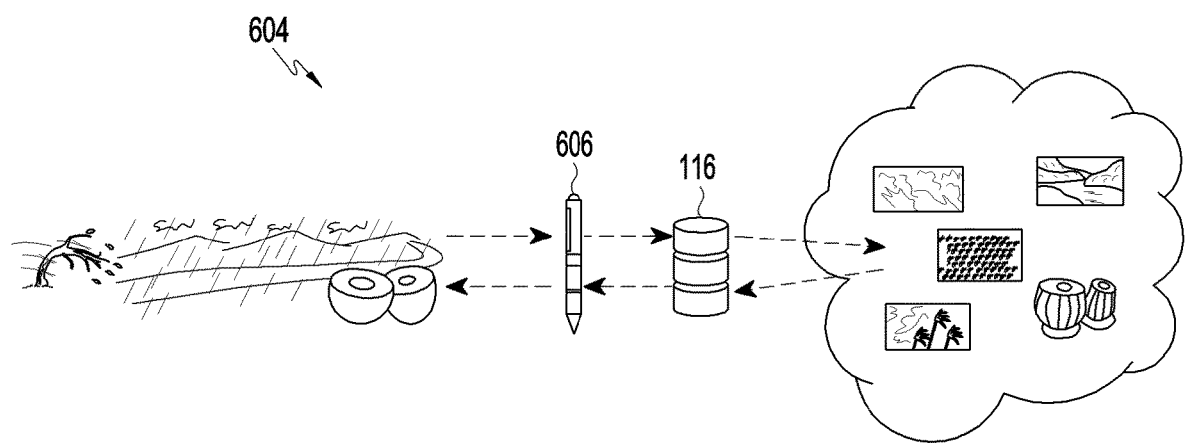
FIG. 6C illustrates mapping of multiple objects to pre-defined objects on server according to an embodiment of the disclosure.

FIG. 6C illustrates mapping of multiple objects to pre-defined objects on server according to an embodiment of the disclosure.

Referring to FIG. 6C, multiple objects 604 are mapped based on a drawing. For example, the user wants to create a symphony using different objects such as a river, blowing wind, peacock voice and table sound, which is membranophone percussion instrument. The user, using a paper and a camera enabled pen 606, user draws a rainy scene and, in the scene, the user also draws a river image flowing from right side to left side. Further, the user draws a tree on the right side of the page and tree looks like bending towards right side due to heavy wind. The user also draws a table on the right side of page. The camera enabled pen 606 sends the information of drawn objects to the server 116, which identifies the drawn objects and maps objects to pre-defined objects as rain, a cloud, a river, a tree in wind, and a tabla.

Figure 6D:
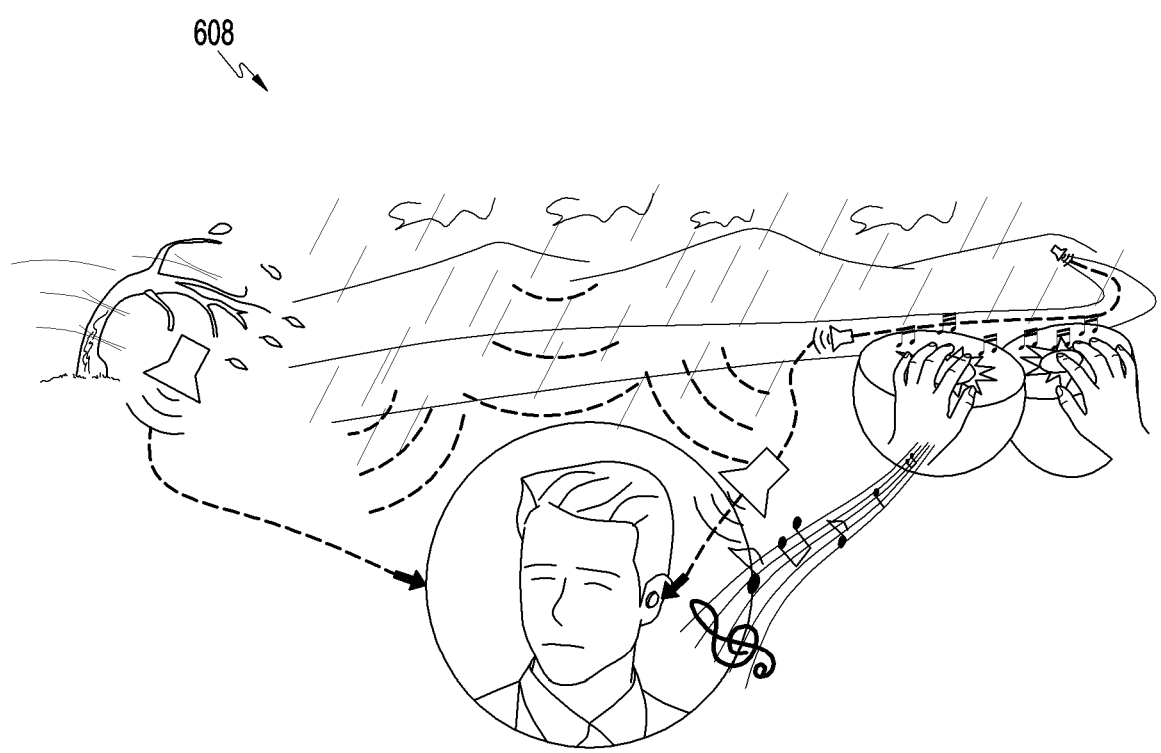
FIG. 6D illustrates perspective sound generation based on a user position according to an embodiment of the disclosure.

FIG. 6D illustrates perspective sound generation based on a user position according to an embodiment of the disclosure.

Referring to FIG. 6D, once the mapping process of the user's position 608 is complete, the user starts listening to the sound of rain in his ear-wearable device and, at the same time, the river starts making the water flowing perspective sound effects as per the direction in the drawing. As such, this sound effect is perceived as coming from far to close as shown in image and, as such, the user perceives sound effects in his ear-wearable device like a heavy wind blowing from left to right with the tree's leaves sound.

According to an embodiment of the disclosure, after mapping process tabla's octave was unlocked, so now it was ready to use as real tabla. Now the user starts playing/interacting with the tabla by his hand/fingers and it sound starts merging with rain, wind, tree and river sound. As the user starts playing the tabla, the user receives the sound based on the perspective of the tabla, which was drawn on the right side of the page. In this example, the user receives the directional perspective sound in from the tabla from his right side of ear-wearable device. The user records and save the perspective music effects and beat of rain, river, wind and tabla.

Figure 7A:
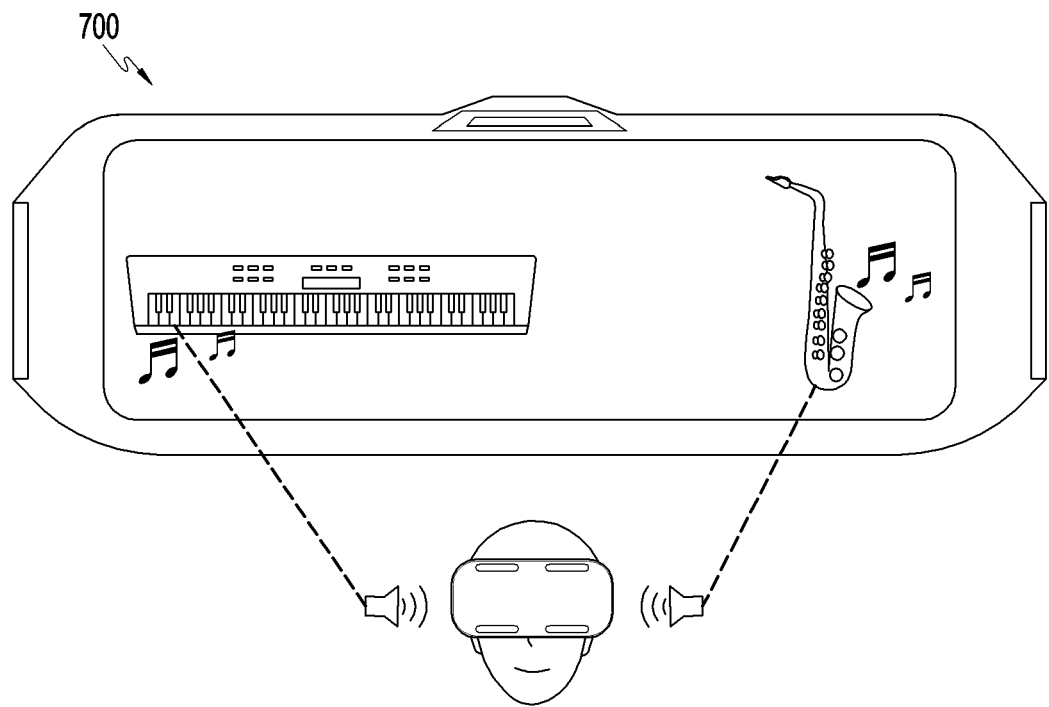
FIG. 7A illustrates user relative position based perspective sound generation according to an embodiment of the disclosure.

FIG. 7A illustrates user relative position based perspective sound generation according to an embodiment of the disclosure.

Referring to FIG. 7A, a user wears a head mounted device and listens to music from multiple musical instruments based on perspective sound generation 700. If a user wants to listen to perspective sound of multiple instruments (for example, a piano and a saxophone), with respect to his head relative position, the user uses either a virtual reality (VR) device, a head mounted device, and the like which provides virtual object mapping and 3D positioning of instruments, for example, a saxophone and a piano. The user then starts interacting with the piano, and a saxophone on the left side of the piano, so perspective sound will be heard from the speaker according to interaction input.

Figure 7B:
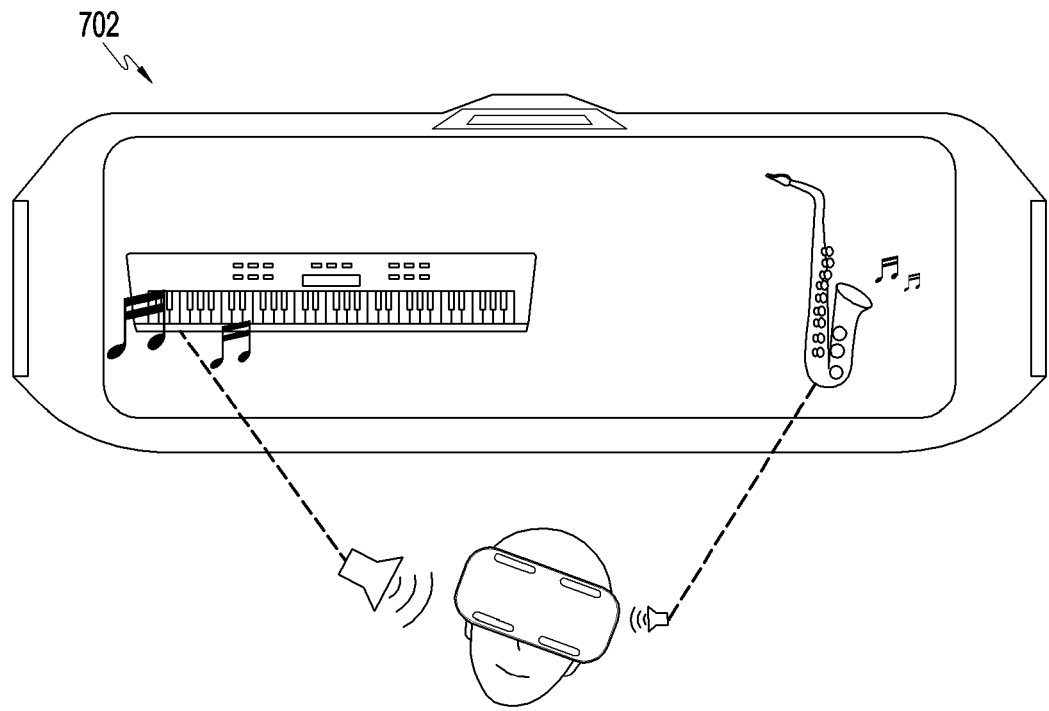
FIG. 7B illustrates an example of perspective sound generation based on a relative position of a user according to an embodiment of the disclosure.

FIG. 7B illustrates an example of perspective sound generation based on a relative position of a user according to an embodiment of the disclosure.

Referring to FIG. 7B, an example 702 illustrates that the user wearing a head mounted device and is capable of detecting the relative position of a user with the help of sensors as the user moves his head in the direction of the piano. As the head mounted device detects such motion, the relative position of the user with the device is detected with the help of said sensors. Thus, perspective sound makes the Piano sound more dominant over Saxophone's sound.

Figure 7C:
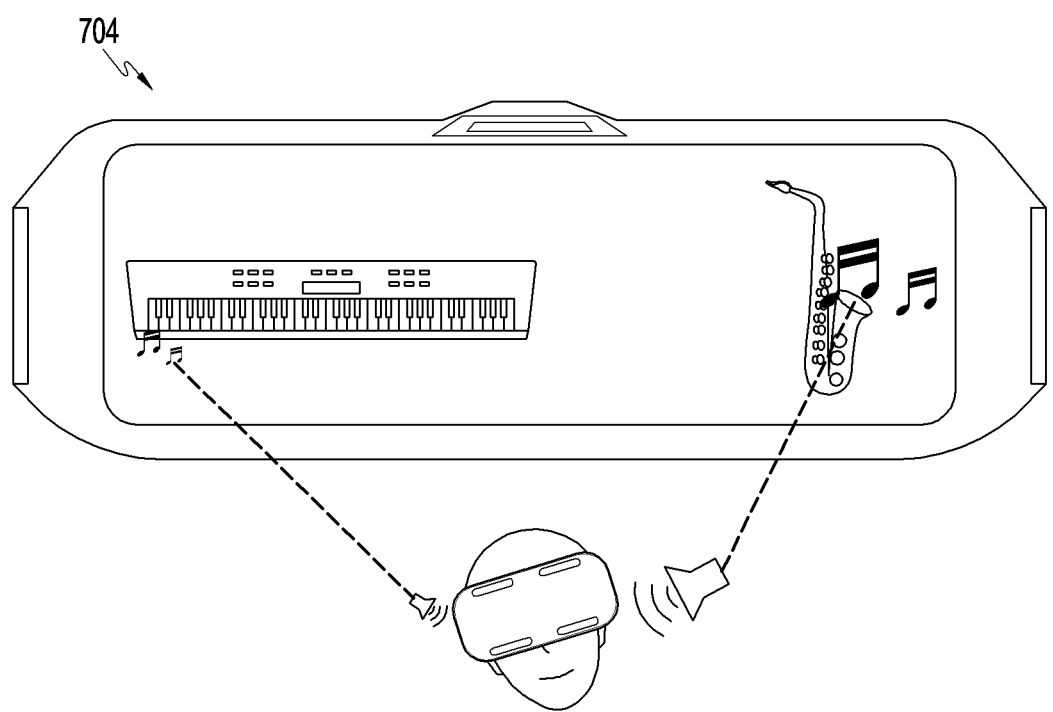
FIG. 7C illustrates an example of perspective sound generation based on a relative position of a user's head with a head mounted device according to an embodiment of the disclosure.

FIG. 7C illustrates an example of perspective sound generation based on a relative position of a user's head with a head mounted device according to an embodiment of the disclosure.

Referring to FIG. 7C, an example 704 illustrates that the head mounted device is capable of detecting motion with the help of sensors and identifying the relative position of the user with respect to the musical instruments on the device. When the user turns his head towards the right side from the left side, the device detects and identifies the relative position of user with the help of sensors. Thus, perspective sound makes the saxophone sound more dominant than the piano's sound.

Figure 8A:
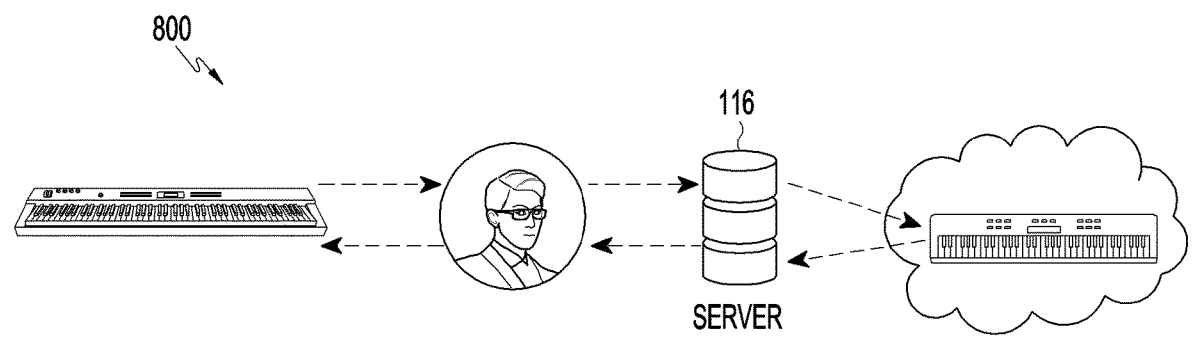
FIG. 8A illustrates mapping of a printed image of an instrument to a pre-defined instrument according to an embodiment of the disclosure.

FIG. 8A illustrates mapping of a printed image of an instrument to a pre-defined instrument according to an embodiment of the disclosure.

Referring to FIG. 8A, the user takes a printed template 800 of a musical instrument, for example, a keyboard on a paper and the Intermediate object identifier device, for example, a head mounted augmented reality device sends the captured image/information to the server 116. The server 116 is configured to identify the printed template of the musical instrument and map it with the pre-defined object, such as a keyboard, further unlocking all its octaves. Once the octave unlocking process is completed, the user starts interacting/playing the instrument.

Figure 8B:
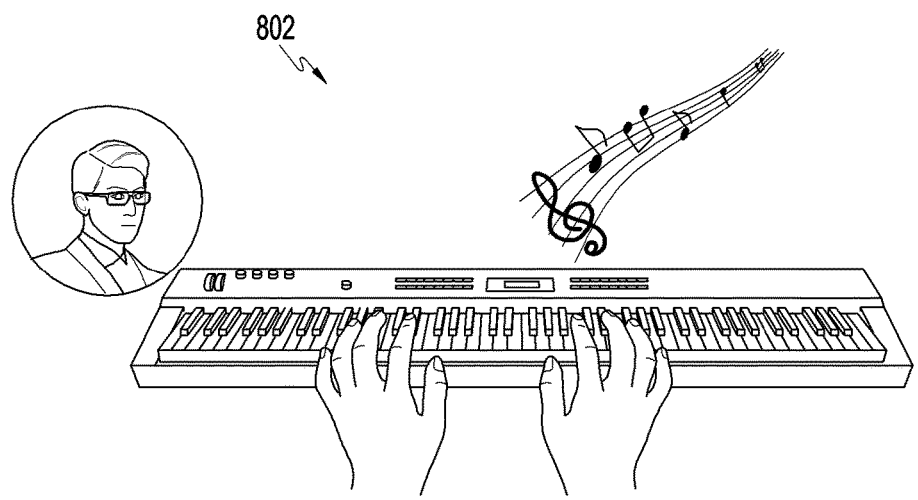
FIG. 8B illustrates a user interacting with a printed template of a music instrument according to an embodiment of the disclosure.

FIG. 8B illustrates a user interacting with a printed template of a music instrument according to an embodiment of the disclosure.

Referring to FIG. 8B, the user is enabled to interact with the printed template 802 of a music instrument, once the mapping of the printed template is done to the music instrument by the server 116 and the octaves are unlocked. The said interaction with the printed template will provide the user with a real-like immersive experience of playing a music instrument.

Figure 9A:
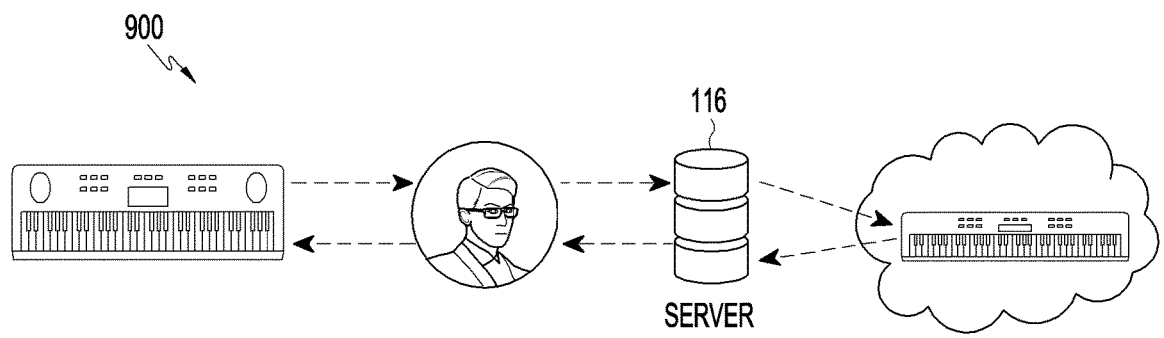
FIG. 9A illustrates mapping of a printed image of a musical instrument according to an embodiment of the disclosure.

FIG. 9A illustrates mapping of a printed image of a musical instrument according to an embodiment of the disclosure.

Referring to FIG. 9A, the user prints the image 900 of a musical instrument on a paper. The Intermediate Object Identifier Device, which includes a head mounted augmented reality (AR) device using the Object Mapping Module 110 sends the information of the printed image of musical instrument to the server 116. The server 116 identifies the device and maps it with a pre-defined object using mapper in the administrative module 122. The mapper after mapping the said musical instrument unlocks the octaves of the instrument as per the requirement of the user. The user interacts with the instrument mapped on the device using the user interaction input 138 in the client module 132 and, for each input, corresponding sounds are generated. As the user interacts with the mapped musical instrument, the sound generator module 112 generates sound based on the user's input.

Figure 9B:
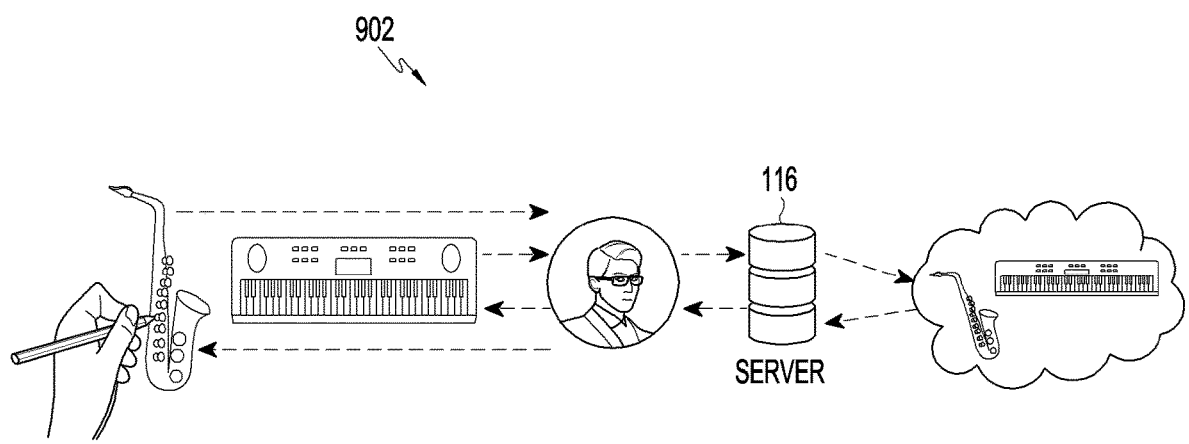
FIG. 9B illustrates mapping of multiple musical instruments on a device according to an embodiment of the disclosure.

FIG. 9B illustrates mapping of multiple musical instruments on a device according to an embodiment of the disclosure.

Referring to FIG. 9B, multiple musical instruments 902 may be played. According to an embodiment of the disclosure, a user using his intermediate object identifier device, for example, a head mounted AR device identifies the printed image of a keyboard on the device. The keyboard is mapped on the device and is capable of generating music as per the user's input. The user is further capable of incorporating another device, for example, a saxophone along with the keyboard to generate a symphony using multiple instruments. The user initiates by drawing a saxophone on a paper and the motion detection module 108, i.e. the head mounted AR device sends the live information to the object mapping module 110. The object mapping module 110 sends the information of the pre-processed image to the server 116, the server 116 in turn, identifies the object and sends the information to the object mapping module 110 which maps the object. All octaves of saxophone are unlocked. The user can now interact with the saxophone and sound will be generated from such instrument. The record and replay module 104 inside the device is capable of recording and replaying already played sounds/symphonies. Since, the user has already played the sound of keyboard and further played the sound of a saxophone, both sounds of the instruments can now be fused to form a single symphony.

According to an embodiment of the disclosure, the user can further add objects such as backgrounds objects including flowing river, chirping birds, wind, and the like. The user may also add musical instruments with printed images, text, drawn image, and the like. The music generated from all these instruments and objects will be fused to create single music track/symphony. The technique of music composition from multiple instruments or objects provides a perspective sound effect and immersive experience to the user.

Figure 10A:
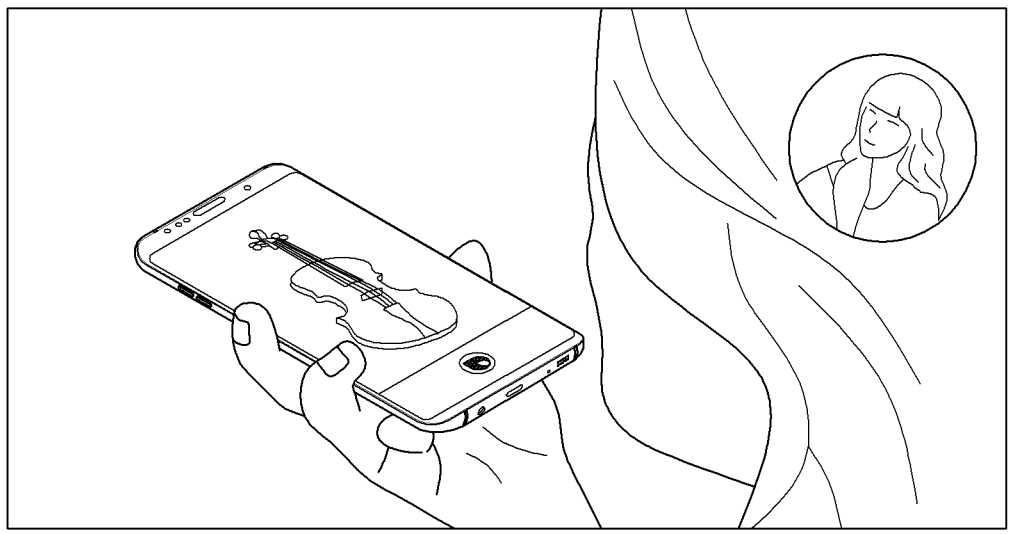
FIG. 10A illustrates a user interacting with a virtual assistant (VA) to map an instrument according to an embodiment of the disclosure.

FIG. 10A illustrates a user interacting with a VA to map an instrument according to an embodiment of the disclosure.

Referring to FIG. 10A, the user gives a voice command to a VA to draw a violin on the device. The VA draws a violin by sending the user's request to the server 116 and maps the said music instrument to the pre-defined object. The octaves of the instrument are also unlocked in real-time.

According to an embodiment of the disclosure, the VA module is configured to receive the voice command given through microphone and processes that input to identify the object/instrument request. The user can give further commands to stop drawing the entire instrument/object and can interact with the partially drawn instrument.

According to an embodiment of the disclosure, the user can reduce or increase the size of the music instrument mapped on the device and also re-arrange the location and position of the device that will affect the location sequence and size sequence of the device.

Figure 10B:
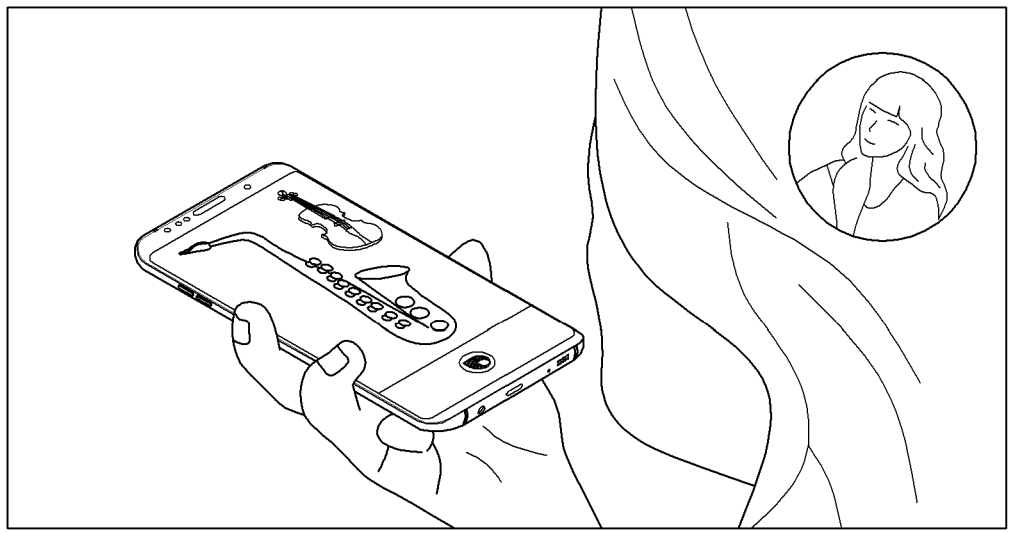
FIG. 10B illustrates a user interacting with the virtual assistant to map another music instrument according to an embodiment of the disclosure.

FIG. 10B illustrates a user interacting with the VA to map another music instrument according to an embodiment of the disclosure.

Referring to FIG. 10B, according to an embodiment of the disclosure, the user gives voice command to the VA 1002 to map another music instrument, for example, a saxophone. The VA draws a saxophone by sending the user's request to the server 116 and maps the music instrument to the pre-defined object. The octaves of the instrument are also unlocked in real-time.

According to an embodiment of the disclosure, the user can resize and rearrange the instrument mapped on the device as per their requirement and preference.

Figure 10C:
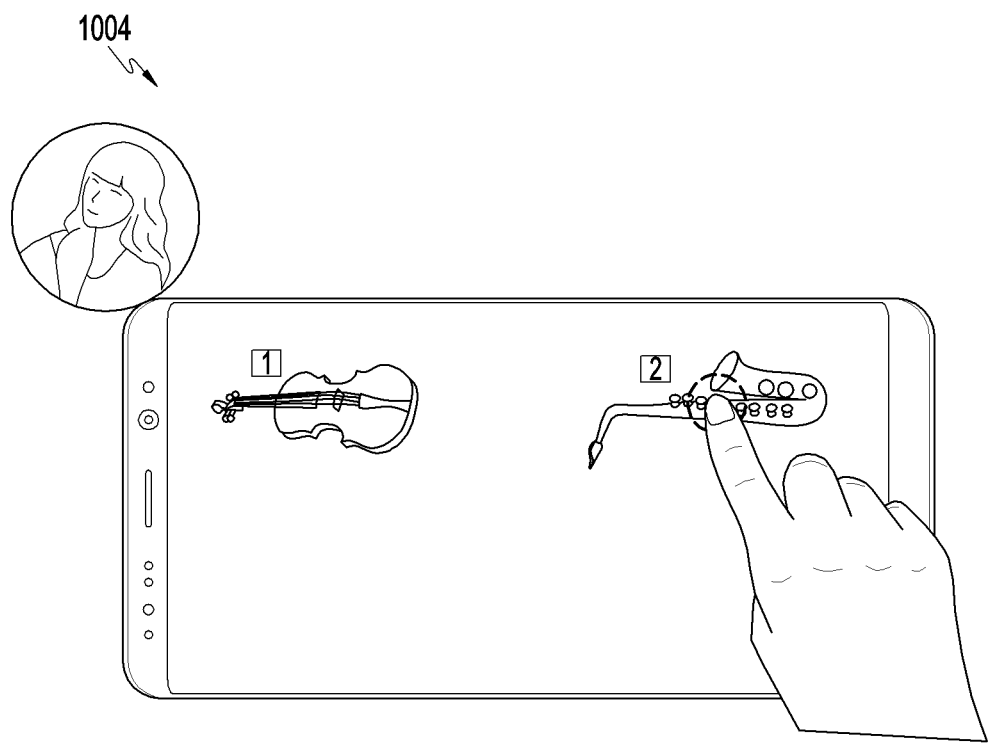
FIG. 10C illustrates a user positioning and scaling/resizing multiple music instruments mapped on the device according to an embodiment of the disclosure.

FIG. 10C illustrates a user positioning and scaling/resizing multiple music instruments mapped on the device according to an embodiment of the disclosure.

Referring to FIG. 10C, once the music instruments 1004 are mapped, the user can reposition and rescale the mapped musical instruments. For example, the user has mapped a violin and a saxophone on the same device, so the user can scale down both the instrument and reposition them on the same device. The user based on the requirement positions the violin on the top left corner of the device and scales it down to a smaller size. Further, the user repositions the saxophone on the top left corner of the device and repositions it to appear smaller than the violin on the device. The mapper module 126 is capable of assigning the location and size sequence to each identified object, i.e. the identified musical instruments, a violin and a saxophone. Based on the size and position, the violin is marked as 1 and the saxophone is marked as 2.

Figure 10D:
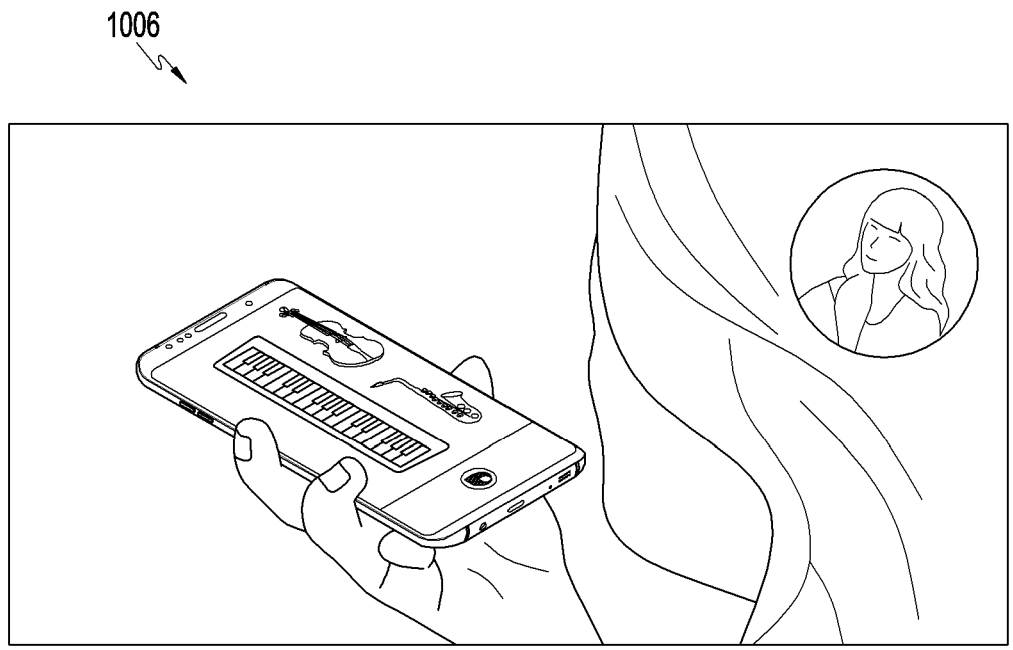
FIG. 10D illustrates the user interacting with virtual assistant to map another object according to an embodiment of the disclosure.

FIG. 10D illustrates the user interacting with VA to map another object according to an embodiment of the disclosure.

Referring to FIG. 10D, the user after mapping 1006 a violin and a saxophone on the device further interacts with the VA to incorporate a keyboard. To initiate the mapping of a keyboard, the user gives a voice command to the virtual assistant to add a keyboard. The VA draws a keyboard by sending the user's request to the server 116 and maps the said music instrument to a pre-defined object. The octaves of the instrument are also unlocked in real-time.

According to an embodiment of the disclosure, the user can reposition and rescale/resize the mapped object/music instrument on the device as per their requirement and preference.

Figure 10E:
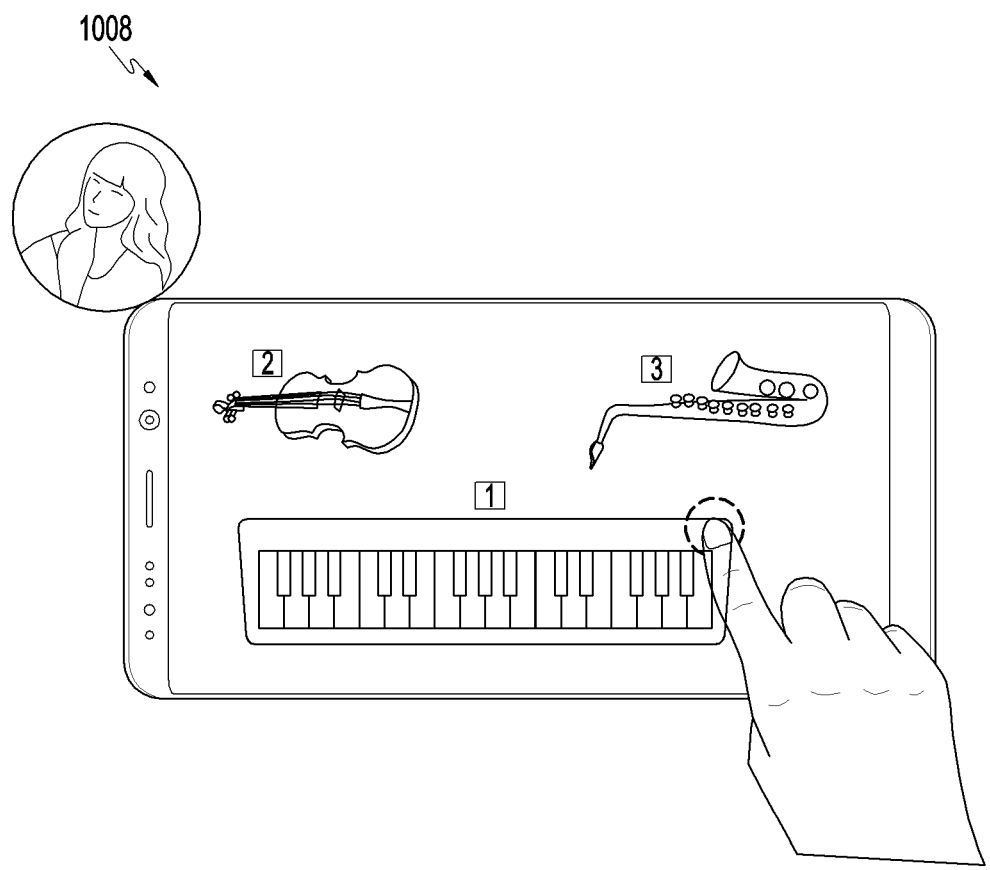
FIG. 10E illustrates user repositioning and interacting with three mapped music instruments and interacting with them according to an embodiment of the disclosure.

FIG. 10E illustrates user repositioning and interacting with three mapped music instruments according to an embodiment of the disclosure.

Referring to FIG. 10E, the user has three objects (e.g., three music instruments) mapped to the same device, and the user can reposition and resize the mapped instrument as per their preference. The user repositions 1008 the keyboard in the middle of the device making it the biggest in size. The violin and saxophone are repositioned on the top left and top right corner, respectively, violin being bigger in size than the saxophone. Thus, based on the size, the instruments are numbered, i.e. keyboard is 1, violin 2 and saxophone being the smallest is marked as 3.

According to another embodiment of the disclosure, as the user interacts with the mapped objects, i.e. the keyboard, violin and saxophone, interacting with them one by one or with two objects or with these objects together, the sound generated is based on perspective. The perspective sound is generated based on the size and location of the instrument. For example, when the violin sound is generated, the sound on the left sound will be more prominent than the sound on the right side. However, in a case the user is interacting with both violin and saxophone, then the sound of violin from the left side will be louder and more prominent than that of the saxophone. Accordingly, if the user is interacting with the violin and the keyboard, the sound from the keyboard will be prominent in the middle and will also be louder than that of the violin.

According to an embodiment of the disclosure, the instruments are marked as 1, 2, 3 . . . and the like by the mapper module 126. The mapper module 126 assigns the location and size sequence to the mapped objects. Further, the mapper module 126 is also responsible for the perspective sound input.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating sound by an electronic device, comprising:
    obtaining at least one image including a plurality of objects corresponding to a plurality of musical instruments, respectively, the plurality of musical instruments including a first musical instrument and a second musical instrument;
    identifying a user input associated with a first object related to the first musical instrument among the plurality of objects; and
    generating sound based on the user input and sound data of the first musical instrument and sound data of the second musical instrument.

2. The method of claim 1, wherein the at least one image further includes at least one non-instrumental object, and the sound is generated further based on sound data of the at least one non-instrumental object.

3. The method of claim 1, wherein the sound is generated based on at least one of position, orientation or size of the plurality of the objects.

4. The method of claim 1, wherein the obtained at least one image comprises at least one of a hand drawn image, a printed image, an image template, a digital surface pattern, a digital format image, or at least one text.

5. The method of claim 1, further comprising:
    pre-processing the at least one image;
    transmitting, to a server, the pre-processed at least one image; and
    receiving, from the server, information on the plurality of the objects in the at least one image.

6. The method of claim 1, further comprising receiving a second input for adjusting at least one of a size or a position of the first object,
    wherein the sound is generated further based on at least one of the size or the position of the first object.

7. The method of claim 1, further comprising:
    receiving position data from a head mounted display; and
    determining an orientation of the head mounted display with respect to the electronic device,
    wherein the sound is generated further based on the orientation of the head mounted display.

8. The method of claim 1, further comprising receiving a voice command for adding an object,
    wherein the sound is generated further based on sound data of at least one third musical instrument associated with the added object.

9. An electronic device for generating sound, comprising:
    a display;
    a transceiver; and
    at least one processor coupled to the display and the transceiver, wherein the at least one processor is configured to:
        obtain at least one image including a plurality of objects corresponding to a plurality of musical instruments, respectively, the plurality of musical instruments including a first musical instrument and a second musical instrument,
        identify a user input associated with a first object related to the first musical instrument among the plurality of objects, and generate sound based on the user input and sound data of the first musical instrument and sound data of the second musical instrument.

10. The electronic device of claim 9, wherein the at least one image further includes at least one non-instrumental object, and the sound is generated further based on sound data of the at least one non-instrumental object.

11. The electronic device of claim 9, wherein the sound is generated based on at least one of position, orientation or size of the plurality of the objects.

12. The electronic device of claim 9, wherein the obtained at least one image comprises at least one of a hand drawn image, a printed image, an image template, a digital surface pattern, a digital format image, or at least one text.

13. The electronic device of claim 9, wherein the at least one processor is further configured to:
 pre-process the at least one image;
 transmit, to a server, the pre-processed at least one image; and
 receive, from the server, information on the plurality of the objects in the at least one image.

14. The electronic device of claim 9,
wherein the at least one processor is further configured to receive a second input for adjusting at least one of a size or a position of the first object, and
wherein the sound is generated further based on at least one of the size or the position of the first object.

15. The electronic device of claim 9,
wherein the at least one processor is further configured to:
 receive position data from a head mounted display, and
 determine an orientation of the head mounted display with respect to the electronic device, and
wherein the sound is generated further based on the orientation of the head mounted display.

16. The electronic device of claim 9,
wherein the at least one processor is further configured to receive a voice command for adding a object, and
wherein the sound is generated further based on sound data of at least one third second musical instrument associated with the object.

* * * * *